United States Patent
Eki et al.

(10) Patent No.: US 11,889,177 B2
(45) Date of Patent: Jan. 30, 2024

(54) ELECTRONIC DEVICE AND SOLID-STATE IMAGING DEVICE

(71) Applicants: Sony Semiconductor Solutions Corporation, Kanagawa (JP); Sony Corporation, Tokyo (JP)

(72) Inventors: Ryoji Eki, Kanagawa (JP); Suguru Aoki, Tokyo (JP); Ryuta Satoh, Tokyo (JP)

(73) Assignees: SONY SEMICONDUCTOR SOLUTIONS CORPORATION, Kanagawa (JP); SONY CORPORATION, Tokyo (JP)

( * ) Notice: Subject to any disclaimer, the term of this patent is extended or adjusted under 35 U.S.C. 154(b) by 27 days.

(21) Appl. No.: 17/266,117

(22) PCT Filed: Aug. 29, 2019

(86) PCT No.: PCT/JP2019/034022
§ 371 (c)(1),
(2) Date: Feb. 5, 2021

(87) PCT Pub. No.: WO2020/045598
PCT Pub. Date: Mar. 5, 2020

(65) Prior Publication Data
US 2021/0297585 A1    Sep. 23, 2021

(30) Foreign Application Priority Data

Aug. 31, 2018   (JP) .................................. 2018-163700
Aug. 22, 2019   (JP) .................................. 2019-152201

(51) Int. Cl.
H04N 23/611    (2023.01)
G06V 40/10     (2022.01)
(Continued)

(52) U.S. Cl.
CPC ........... *H04N 23/611* (2023.01); *G06V 40/10* (2022.01); *G06V 40/172* (2022.01); *G06V 40/174* (2022.01); *H04N 23/69* (2023.01)

(58) Field of Classification Search
CPC ........... H04N 5/23219; H04N 5/23296; H04N 5/23212; H04N 5/23222; H04N 5/232411;
(Continued)

(56) References Cited

U.S. PATENT DOCUMENTS 5,578,809 A      11/1996  Yamaji
10,275,670 B1 *  4/2019   Li ......................... B60R 25/305
(Continued)

FOREIGN PATENT DOCUMENTS

CN   101008983 A     8/2007
CN   101205772 A  *  6/2008
(Continued)

OTHER PUBLICATIONS

International Search Report and Written Opinion dated Oct. 29, 2019, received for PCT Application PCT/JP2019/034022, Filed on Aug. 29, 2019, 17 pages including English Translation.
(Continued)

*Primary Examiner* — Abdelaaziz Tissire
(74) *Attorney, Agent, or Firm* — XSENSUS LLP

(57) ABSTRACT

The present invention suppresses an increase in processing time and power consumption that is associated with function implementation. An electronic device according to an embodiment comprises: an imaging unit (11) that generates image data; a processing unit (14) that executes neural network calculation model-based processing with respect to image data-based data that is read out from the imaging unit; a function execution unit (12) that performs a predetermined function on the basis of the results of the processing; and a
(Continued)

detection unit (32) that detects displacement, wherein the processing unit executes the processing when the detection unit detects displacement.

4 Claims, 19 Drawing Sheets

(51) Int. Cl.
*G06V 40/16* (2022.01)
*H04N 23/69* (2023.01)

(58) Field of Classification Search
CPC ............. H04N 5/2353; H04N 5/23216; H04N 23/611; H04N 23/69; H04N 23/64; H04N 23/651; H04N 23/67; H04N 23/73; H04N 23/62; G06V 40/10; G06V 40/172; G06V 40/174; G06V 40/168; G03B 13/36; G03B 15/14; G03B 29/00; G06T 2207/20084; G06T 2207/30201; G06T 7/73; G06T 3/60; G06F 21/32; G06N 3/04; G06N 3/08
See application file for complete search history.

(56) References Cited

U.S. PATENT DOCUMENTS

| | | | |
|---|---|---|---|
| 2004/0028137 A1 | 2/2004 | Wyn-Harris | |
| 2006/0242434 A1* | 10/2006 | Lee | G06F 3/017 713/300 |
| 2007/0244842 A1 | 10/2007 | Ishii et al. | |
| 2009/0032597 A1 | 2/2009 | Barber et al. | |
| 2009/0160609 A1* | 6/2009 | Lin | G06F 21/32 340/5.83 |
| 2009/0258667 A1 | 10/2009 | Suzuki et al. | |
| 2012/0057795 A1 | 3/2012 | Konishi | |
| 2012/0235790 A1* | 9/2012 | Zhao | H04W 12/065 340/5.83 |
| 2012/0257091 A1* | 10/2012 | Kim | H04N 5/2354 348/297 |
| 2012/0301032 A1 | 11/2012 | Kawanishi et al. | |
| 2013/0088606 A1 | 4/2013 | Yagur | |
| 2014/0299665 A1 | 10/2014 | Barber et al. | |
| 2014/0334718 A1 | 11/2014 | Yamada et al. | |
| 2015/0365610 A1 | 12/2015 | Dominguez Castro et al. | |
| 2016/0021302 A1 | 1/2016 | Cho et al. | |
| 2016/0148079 A1 | 5/2016 | Shen | |
| 2017/0150051 A1 | 5/2017 | Ito et al. | |
| 2017/0213112 A1 | 7/2017 | Sachs | |
| 2017/0280047 A1* | 9/2017 | Kinoshita | H04N 5/23219 |
| 2018/0061020 A1 | 3/2018 | Hiasa | |
| 2018/0092587 A1 | 4/2018 | Tzvieli et al. | |
| 2018/0164424 A1 | 6/2018 | Takaki | |
| 2019/0387186 A1 | 12/2019 | Ando | |
| 2020/0112662 A1 | 4/2020 | Sakamoto et al. | |
| 2021/0307621 A1* | 10/2021 | Svenson | A61B 5/02416 |

FOREIGN PATENT DOCUMENTS

| | | | |
|---|---|---|---|
| CN | 101320425 A | 12/2008 | |
| CN | 102194115 A | 9/2011 | |
| CN | 102857688 A | 1/2013 | |
| CN | 103077407 A | 5/2013 | |
| CN | 103080978 A | 5/2013 | |
| CN | 103391398 A | 11/2013 | |
| CN | 103716661 A | 4/2014 | |
| CN | 103942242 A | 7/2014 | |
| CN | 104102340 A | 10/2014 | |
| CN | 105049685 A | 11/2015 | |
| CN | 105373785 A | 3/2016 | |
| CN | 107563168 A | 1/2018 | |
| CN | 107944351 A | 4/2018 | |
| CN | 108073943 A | 5/2018 | |
| EP | 1 011 074 A2 | 6/2000 | |
| JP | 2005-128967 A | 5/2005 | |
| JP | 2005-341097 A | 12/2005 | |
| JP | 2010-020421 A | 1/2010 | |
| JP | 2011-3860 A | 1/2011 | |
| JP | 2011-35771 A | 2/2011 | |
| JP | 2011-160044 A | 8/2011 | |
| JP | 2011-203860 A | 10/2011 | |
| JP | 2011203860 A * | 10/2011 | |
| JP | 2012-208606 A | 10/2012 | |
| JP | 2012-252507 A | 12/2012 | |
| JP | 2013120949 A | 6/2013 | |
| JP | 2014-53722 A | 3/2014 | |
| JP | 2015-136093 A | 7/2015 | |
| JP | 2017-183775 A | 10/2017 | |
| JP | 2017-228975 A | 12/2017 | |
| JP | 2018-55138 A | 4/2018 | |
| JP | 2018-61290 A | 4/2018 | |
| JP | 2018-116589 A | 7/2018 | |
| JP | 2018-117309 A | 7/2018 | |
| JP | 2018-133749 A | 8/2018 | |
| JP | 2018-136767 A | 8/2018 | |
| KR | 10-2011-0056616 A | 5/2011 | |
| WO | 2007/119818 A1 | 10/2007 | |
| WO | 2008/004578 A1 | 1/2008 | |
| WO | 2012/073421 A1 | 6/2012 | |
| WO | 2018/003212 A1 | 1/2018 | |
| WO | 2018/037521 A1 | 3/2018 | |

OTHER PUBLICATIONS

Notonogoro et al., "Indonesian License Plate Recognition Using Convolutional Neural Network", 2018 6th International Conference on Information and Communication Technology (ICOICT), IEEE, May 3, 2018, pp. 366-369.

* cited by examiner

ELECTRONIC DEVICE AND SOLID-STATE IMAGING DEVICE

CROSS-REFERENCE TO RELATED APPLICATIONS

The present application is based on PCT filing PCT/JP2019/034022, filed Aug. 29, 2019, which claims priority to JP 2018-163700, filed Aug. 31, 2018, and JP 2019-152201, filed Aug. 22, 2019, the entire contents of each are incorporated herein by reference.

FIELD

The present invention relates to an electronic device and a solid-state imaging device.

BACKGROUND

In recent years, as advances have been made in the performance of imaging devices such as compact cameras installed in digital still cameras, digital video cameras, mobile phones, and the like, imaging devices have been developed that incorporate an auto-exposure (AE) function for automatic exposure adjustment, an autofocus (AF) function for automatic focus adjustment, an auto-shutter function for automatic shutter operation, and an auto color correction function for automatically adjusting the color matrix according to the subject or scene, and the like.

CITATION LIST

Patent Literature

Patent Literature 1: Japanese Laid-open Patent Publication No. 2018-061290
Patent Literature 2: Japanese Laid-open Patent Publication No. 2017-183775

SUMMARY

Technical Problem

However, conventionally, in order to execute additional functions such as auto exposure, auto focus, auto shutter, and auto color correction, image processing of one to multiple frames' worth of image data is required. Thus, there has been the problem of increased processing time and power consumption in order to implement the functions.

Therefore, the present disclosure proposes an electronic device and a solid-state imaging device that enable suppression of an increase in processing time and power consumption that is associated with function implementation.

Solution to Problem

To solve the above-described problem, an electronic device according to one aspect of the present disclosure comprises: an imaging unit that generates image data; a processing unit that executes neural network calculation model-based processing with respect to image data-based data that is read out from the imaging unit; a function execution unit that performs a predetermined function on the basis of the results of the processing; and a detection unit that detects displacement, wherein the processing unit executes the processing when the detection unit detects displacement.

DESCRIPTION OF EMBODIMENTS

Figure 1:
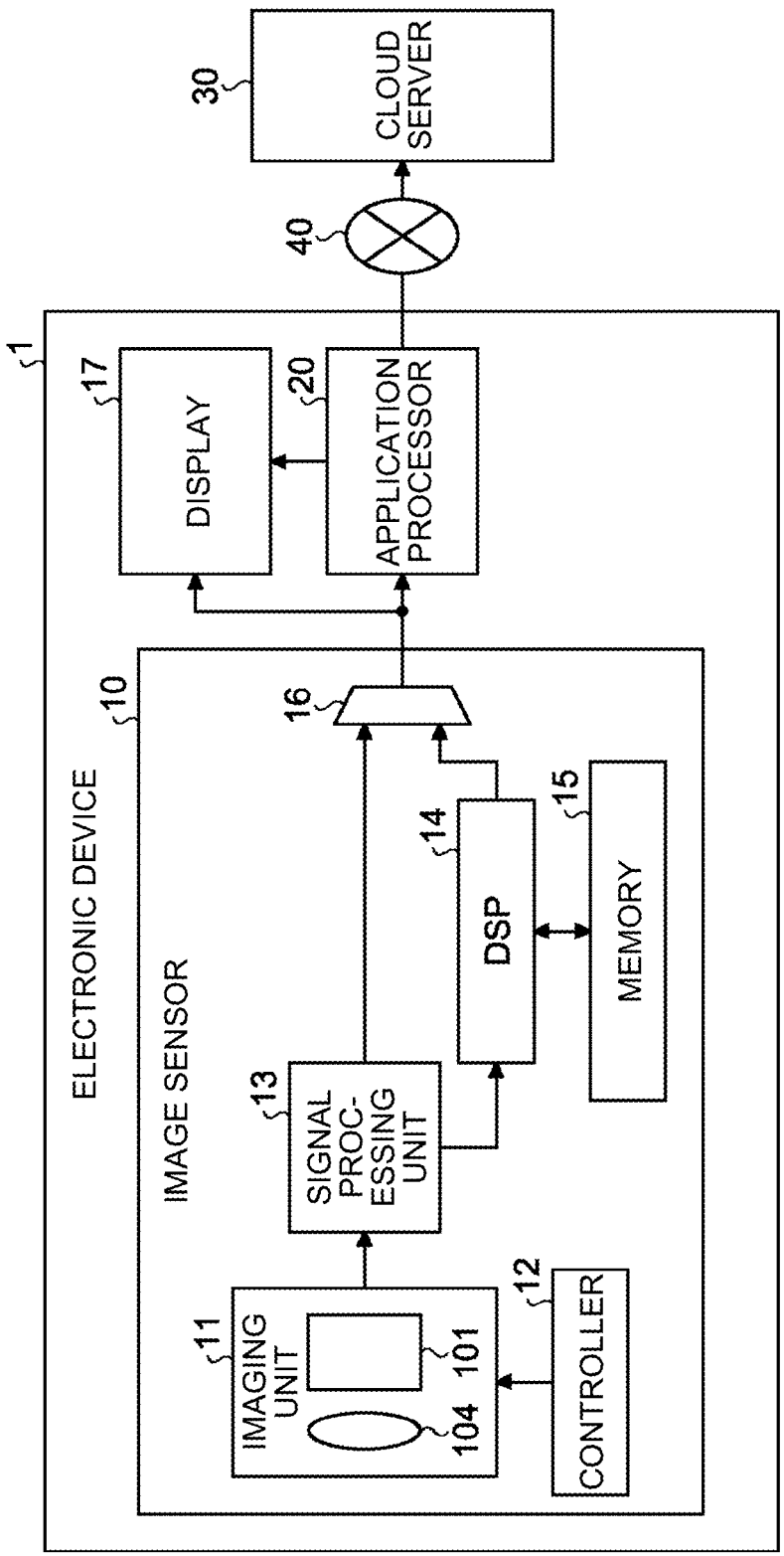
FIG. 1 is a block diagram illustrating a schematic configuration example of an imaging device of an electronic device according to a first embodiment.

An embodiment of the present disclosure will be described in detail hereinbelow on the basis of the drawings. Note that duplicate descriptions are omitted from the embodiments hereinbelow by assigning the same reference signs to the same parts.

Furthermore, the present disclosure will be described according to the item order illustrated hereinbelow:
1. First Embodiment
  1.1 Schematic configuration example of electronic device
  1.2 Operation of processing unit
    1.2.1 Specific example of computation operation
  1.3 Execution of additional functions utilizing computation results
  1.4 Operation and effect
2. Second Embodiment
  2.1 Operation example
  2.2 Operation and effect
3. Third Embodiment
  3.1 Schematic configuration example of electronic device
  3.2 Operation example
  3.3 Operation and effect
4. Fourth Embodiment
  4.1 Schematic configuration example of electronic device
  4.2 Operation example
  4.3 Operation and effect
5. Fifth Embodiment
  5.1 Schematic configuration example of electronic device
  5.2 Operation example
  5.3 Operation and effect
6. Sixth Embodiment
  6.1 Schematic configuration example of electronic device
  6.2 Operation example
  6.3 Operation and effect
7. Seventh Embodiment
  7.1 Operation example
  7.2 Operation and effect
8. Eighth Embodiment
  8.1 Operation example
  8.2 Operation and effect
9. Example of application to moving body
10. Example of application to endoscope surgery system 1. First Embodiment First, a first embodiment will be described in detail with reference to the drawings.

1.1 Schematic Configuration Example of Electronic Device

FIG. 1 is a block diagram illustrating a schematic configuration example of an electronic device according to the first embodiment. As illustrated in FIG. 1, the electronic device 1 is provided with an image sensor 10 which is a solid-state imaging device; and an application processor 20. The image sensor 10 is provided with an imaging unit 11; a controller 12; a signal processing unit 13; a digital signal processor (DSP) 14; a memory 15; and a selector (also called an output unit) 16.

The controller 12 controls each part in the image sensor 10 according to user operations or an operation mode which has been set, for example.

The imaging unit 11 is provided with: an optical system 104 equipped with a zoom lens, a focusing lens, and a diaphragm, and the like; and a pixel array unit 101 that is provided with a configuration in which unit pixels containing light-receiving elements (also called photoelectric conversion units) such as photodiodes are arranged in a two-dimensional matrix, for example. Incident light from the outside is focused, via the optical system 104, on a light-receiving surface upon which the light-receiving elements of the pixel array unit 101 are arranged. The unit pixels of the pixel array unit 101 each photoelectrically converts light falling incident on the light-receiving elements, and thus charge corresponding to the amount of incident light is readably stored.

The signal processing unit 13 performs various signal processing on the pixel signal which is read from each unit pixel of the imaging unit 11. For example, the signal processing unit 13 converts the analog pixel signals read from the unit pixels of the pixel array unit 101 to digital-value image data. Furthermore, when the image data is a color image, for example, the signal processing unit 13 converts the format of the image data to YUV image data or RGB image data, or the like. In addition, if necessary, the signal processing unit 13 executes processing such as noise removal or white balance adjustment with respect to the image data, for example. The signal processing unit 13 also subjects the image data to various signal processing (also called pre-processing), which is required for the DSP 14 to process the image data.

By reading out and executing programs stored in the memory 15, for example, the DSP 14 functions as a processing unit that executes various processing by using learned models which are created through machine learning using a deep neural network (DNN). For example, by executing arithmetic processing based on a learned model stored in the memory 15, the DSP 14 executes processing to multiply the lexicon factors stored in the memory 15 by the image data. The results (computation results) obtained through such arithmetic processing are outputted to the memory 15 and/or the selector 16. Note that the computation results may include image data which is obtained by executing the arithmetic processing using the learned model, image data processed on the basis of the computation results, and various information obtained from the image data (region information representing a partial region of the image, or the like; hereinafter called metadata), and so forth. Furthermore, the DSP 14 may also incorporate a memory controller for controlling access to the memory 15.

As arithmetic processing, there exists, for example, processing that utilizes a learned learning model which is an example of a neural network calculation model. For example, the DSP 14 is also capable of using a learned learning model to execute DSP processing constituting a variety of processing. For example, the DSP 14 reads image data from the memory 15 and inputs the same to the learned learning model, and acquires, as the output result of the learned model, a face contour, or a face position which is a region of a facial image. The DSP 14 then performs processing such as masking, mosaicing, and avatarization on the extracted face position in the image data, thereby generating processed image data. Thereafter, the DSP 14 stores the generated image data that has been processed (the processed image data) in the memory 15.

Furthermore, learned learning models include DNNs and support vector machines, and the like, with which learning data is used to detect the face position of a person, and so forth. When image data constituting discrimination target data is inputted, the learned learning model outputs region information such as an address or the like specifying the discrimination result, that is, the face position. Note that the DSP 14 is capable of updating the learning model by using learning data to change the weightings of various parameters in the learning model, of preparing a plurality of learning models and changing the learning model used according to the content of the arithmetic processing, of acquiring a learned learning model from an external device or updating the learned learning model, and of executing the foregoing arithmetic processing.

Note that the image data which is the object of processing by the DSP 14 may be image data that is read out normally from the pixel array unit 101 or may be image data the data size of which is compressed by thinning the pixels of image data that has been read out normally. Alternatively, the image data may be read out in a data size which is smaller than normal by executing a readout for which the pixels of the pixel array unit 101 have been thinned. Note that a normal readout here may also be a readout performed without thinning the pixels.

By means of such processing to extract and process a face position by using a learning model, it is possible to generate processed image data which is obtained by masking the face position of the image data, processed image data which is obtained by subjecting the face position of the image data to mosaicing, or processed image data which is obtained by replacing the face position of the image data with a character and avatarizing the same.

If necessary, the memory 15 stores the computation results and the like obtained by the DSP 14. Furthermore, the memory 15 stores algorithms for the learned learning models executed by the DSP 14 as programs and lexicon factors. The programs and lexicon factors of the learned learning models are created on an external cloud server 30 or the like and downloaded to the electronic device 1 via a network 40 to be stored in the memory 15, or may be stored in the memory 15 before shipment of the electronic device 1, for example.

The selector 16 selectively outputs the image data outputted from the signal processing unit 13 and the computation results outputted from the DSP 14 in accordance with a select control signal from the controller 12, for example. Note that the DSP 14 may directly output the computation results obtained by the arithmetic processing to the selector 16 or may read out the results from the memory 15 after temporary storage thereof in the memory 15 and output the results to the selector 16.

The image data and computation results outputted from the selector 16, as mentioned above, are inputted to the application processor 20 that processes a display and a user interface, and the like. The application processor 20 is constituted using a central processing unit (CPU) or the like, for example, and runs the operating system and various application software or the like. The application processor 20 may also have built-in functions such as a graphics processing unit (GPU) and a baseband processor. The application processor 20 subjects the inputted image data and computation results to various processing if necessary, executes a display thereof for the user, and transmits the image data and computation results to the external cloud server 30 via a predetermined network 40.

Furthermore, the electronic device 1 is provided with a display 17 to display the image data outputted from the image sensor 10 together with various menus for setting/executing functions. The display 17 functions as a viewfinder and also functions as a display that displays a graphical user interface (GUI) screen for an operating system and application software which are run by the application processor 20, for example. Note that the display 17 may be a touch screen that also functions as a user interface.

Note that it is possible to adopt various networks as the predetermined network 40, such as the internet, a wired local area network (LAN), a wireless LAN, a mobile communication network, or Bluetooth (registered trademark), for example. Furthermore, the recipient of the image data and computation results is not limited to the cloud server 30, rather, various information processing devices (systems) having a communication function may also be used, such as a standalone server, a file server that stores various data, or a communication terminal such as a mobile phone.

1.2 Operation of Processing Unit

Next, the operation of the DSP 14, which functions as a processing unit in this embodiment, will be described in detail hereinbelow with reference to the drawings.

Figure 2:
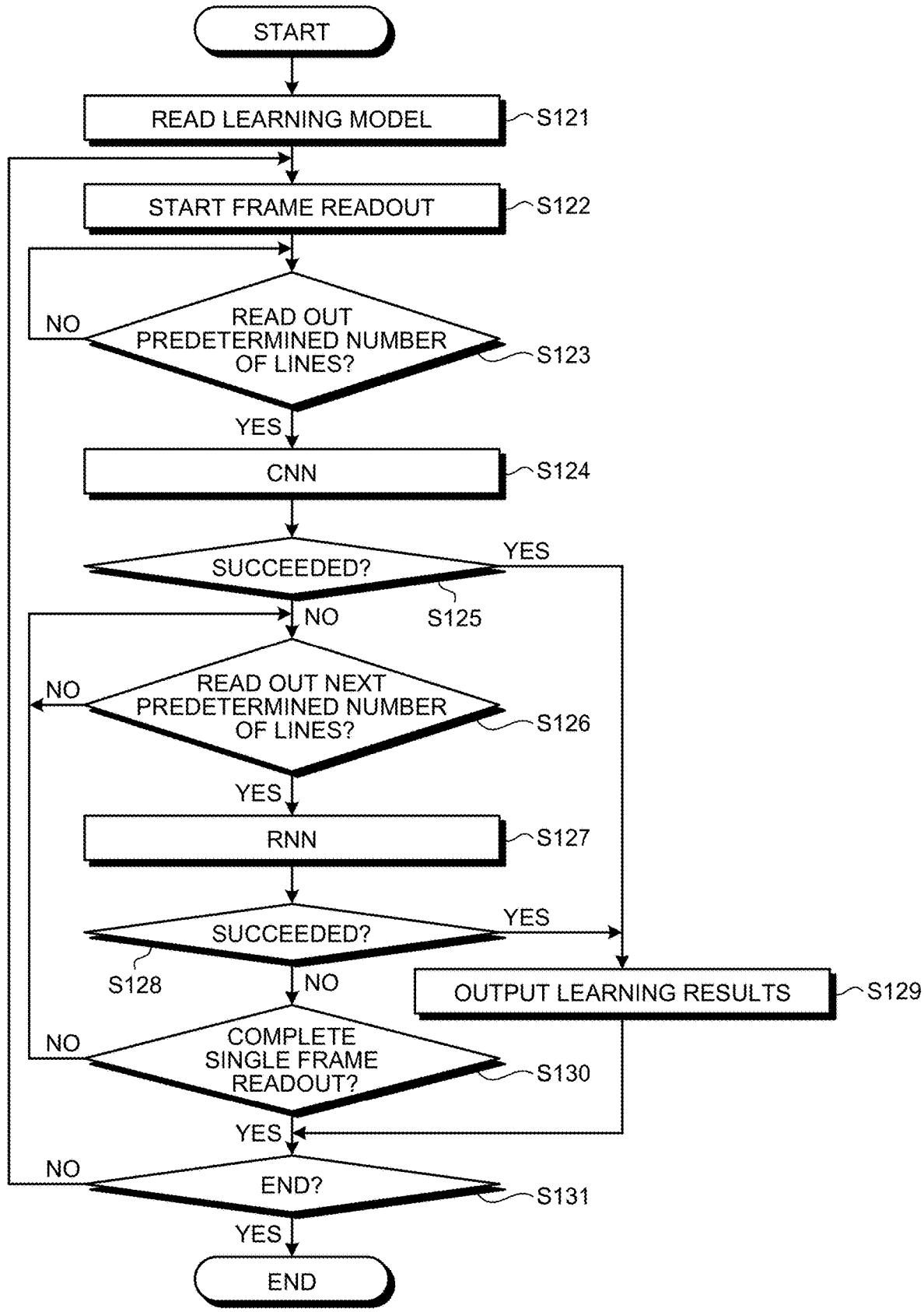
FIG. 2 is flowchart illustrating an example of the operation of an image sensor when a DSP according to the first embodiment is made to function as a processing unit.

As described hereinabove, the DSP 14 according to this embodiment functions as a processing unit utilizing a DNN, by reading out and executing a learned learning model stored in the memory 15. FIG. 2 illustrates an example of the operation of the image sensor 10 when the DSP 14 is made to function as a processing unit.

As illustrated in FIG. 2, in this operation, the DSP 14 first reads out and executes a learned learning model from the memory 15 (step S121). The DSP 14 thus functions as a processing unit.

Next, the controller 12 starts to read out a frame from the imaging unit 11 (step S122). In this frame readout, one frame's worth of image data is read out sequentially in horizontal line units (also called line units), for example.

Next, when image data having a predetermined number of lines of one frame is read out (YES in step S123), the DSP 14 performs arithmetic processing utilizing a convolution neural network (CNN) on the predetermined number of lines' worth of image data thus read out (step S124). That is, the DSP 14 performs arithmetic processing utilizing a learned learning model by taking image data of a predetermined number of lines as a unit region. Further, in the arithmetic processing utilizing a CNN, face detection, face authentication, line-of-sight detection, facial expression recognition, face direction detection, object detection, object recognition, movement (moving object) detection, pet detection, scene recognition, state detection, avoidance-target recognition, and so forth, are executed, for example.

Here, face detection is processing to detect the face of a person contained in the image data. Face authentication is one kind of biometric authentication and is processing to authenticate whether or not the face of a person contained in the image data matches the face of a pre-registered person. Line-of-sight detection is processing to detect the direction of the line of sight of a person contained in the image data. Facial expression recognition is processing to recognize the facial expression of a person contained in the image data. Face direction detection is processing to detect the up-down direction of the face of a person contained in the image data. Object detection is processing to detect an object contained in the image data. Object recognition is processing to recognize what an object contained in the image data is. Object (moving object) detection is processing to detect a moving object contained in the image data. Pet detection is processing to detect a pet such as a dog or cat contained in the image data. Scene recognition is processing to recognize an imaged scene (the sea or mountains, and the like). State detection is processing to detect the state (a normal state or an abnormal state, or the like) of a person or the like contained in the image data. Avoidance-target recognition is processing to recognize an object which is an avoidance target that is present ahead in the direction of advancement in the case of autonomous movement.

When arithmetic processing utilizing a CNN succeeds (YES in step S125), the operation advances to step S129. On the other hand, when arithmetic processing utilizing a CNN fails (NO in step S125), the processing waits for the image data of the next predetermined number of lines to be read out from the imaging unit 11 (NO in step S126).

Note that, in this description, success of the arithmetic processing signifies that, in the face detection or face authentication or the like as detailed earlier, a certain detection result, recognition result, or authentication has been obtained, for example. On the other hand, failure of the arithmetic processing signifies that, in the face detection or face authentication or the like as detailed earlier, an adequate detection result, recognition result, or authentication has not been obtained, for example.

Thereafter, in step S126, when the image data of the next predetermined number of lines (unit region) is read out (YES in step S126), the DSP 14 performs arithmetic processing utilizing a recurrent neural network (RNN) on the image data of the predetermined number of lines thus read out (step S127). In arithmetic processing utilizing an RNN, the results of arithmetic processing utilizing a CNN or RNN, hitherto performed on the image data of the same frame, for example, are also utilized.

When arithmetic processing utilizing an RNN succeeds (YES in step S128), the operation advances to step S129.

In step S129, the computation results that have succeeded in step S124 or S127 are outputted from the DSP 14 to the application processor 20 via the selector 16 or stored in the memory 15, for example.

Furthermore, when the arithmetic processing utilizing RNN fails in step S127 (NO in step S128), it is determined whether or not the readout of one frame's worth of image data is complete (step S130), and when not complete (NO in step S130), the operation returns to step S126, whereupon processing of the image data of the next predetermined number of lines is executed.

On the other hand, when the readout of one frame's worth of image data is complete (YES in step S130), for example, the controller 12 determines whether or not to end the operation (step S131), and upon determining not to end the operation (NO in step S131), returns to step S122 and performs the same operation on the next frame. Further, when a determination to end the operation is made (YES in step S131), the operation ends.

Note that the determination whether to or not to move to the next frame (step S131) may be made on the basis of whether or not an end instruction has been inputted from outside such as an application processor 20, or may be made on the basis of whether or not a series of processes have been completed for image data of a predetermined number of frames determined beforehand, for example.

Furthermore, in a case where arithmetic processing such as face detection, face authentication, line-of-sight detection, facial expression recognition, face direction detection, object detection, object recognition, movement (moving object) detection, scene recognition, and state detection are performed in succession, when the immediately preceding arithmetic processing fails, the subsequent arithmetic processing may be skipped. For example, in a case where face authentication is executed following face detection, when face detection fails, the subsequent face authentication may be skipped.

1.2.1 Specific Example of Computation Operation

Continuing on, the operation of the processing unit described using FIG. 2 will be described using a specific example. Note that a case where face detection is executed by utilizing a DNN is illustrated hereinbelow.

Figure 3:
FIG. 3 is a diagram illustrating an example of one frame's worth of image data.
Figure 4:
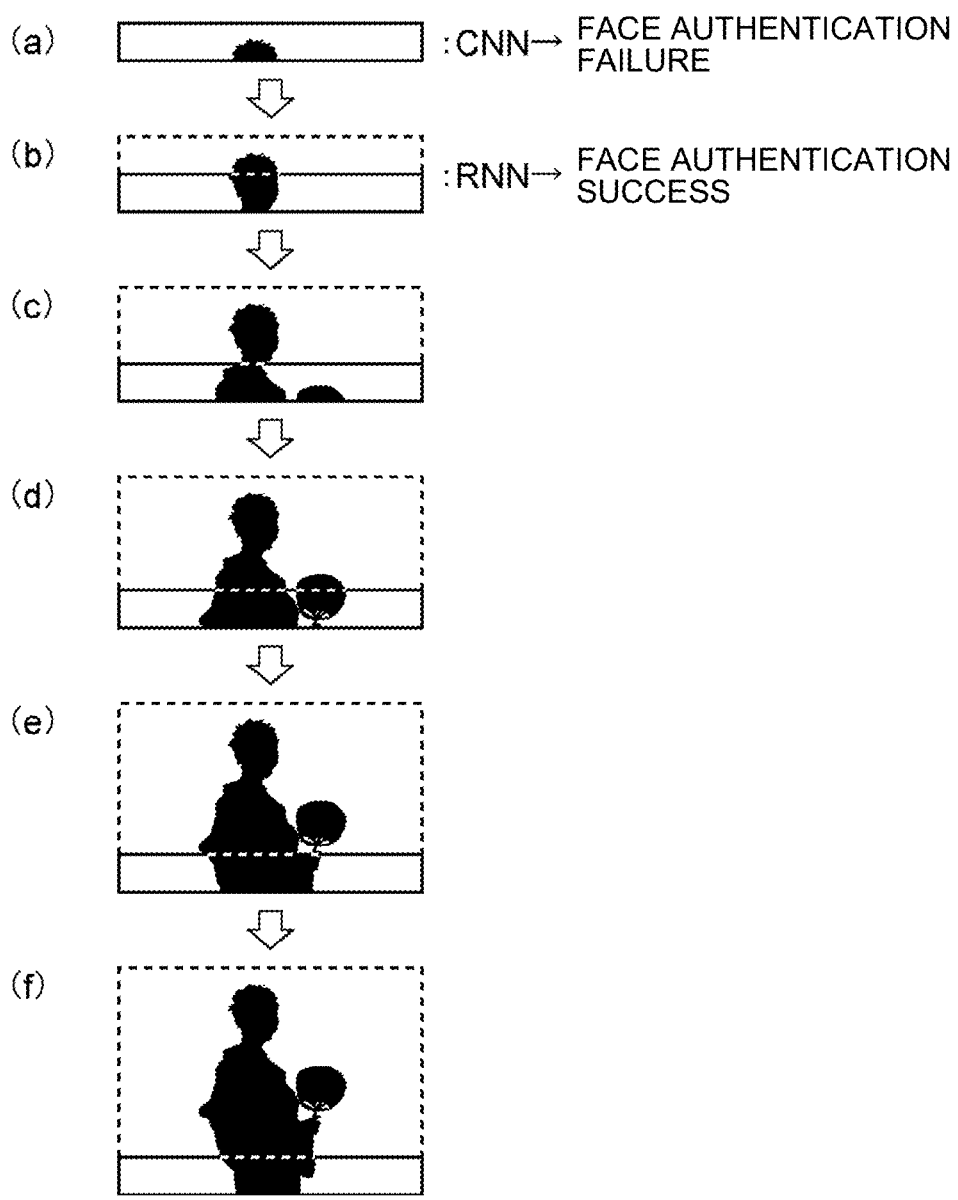
FIG. 4 is a diagram to illustrate the flow of arithmetic processing executed by the DSP according to the first embodiment.

FIG. 3 is a diagram illustrating an example of one frame's worth of image data. FIG. 4 is a diagram to illustrate the flow of arithmetic processing executed by the DSP according to this embodiment.

When face detection is executed by means of arithmetic processing of image data as illustrated in FIG. 3, a predetermined number of lines' worth of image data is first inputted to the DSP 14, as illustrated in FIG. 4(a) (corresponds to step S123 in FIG. 2). By performing arithmetic processing utilizing a CNN on the inputted predetermined number of lines' worth of image data, the DSP 14 executes face detection (corresponds to step S124 of FIG. 2). However, at the stage of FIG. 4(a), because the image data of the whole face has not yet been inputted, the DSP 14 fails in the face detection (corresponds to NO in step S125 of FIG. 2).

Continuing on, as illustrated in FIG. 4(b), the next predetermined number of lines' worth of image data is inputted to the DSP 14 (corresponds to step S126 in FIG. 2). The DSP 14 performs face detection by using the results of the arithmetic processing utilizing a CNN which has been performed on the predetermined number of lines' worth of image data inputted in FIG. 4(a) while performing arithmetic processing utilizing an RNN on the newly inputted predetermined number of lines' worth of image data (corresponds to step S127 of FIG. 2).

At the stage of FIG. 4(b), image data of the whole face is inputted by combining the predetermined number of lines' worth of image data inputted at the stage of FIG. 4(a) with the aggregate data. Therefore, at the stage of FIG. 4(b), the DSP 14 succeeds in the face detection (corresponds to YES in step S128 of FIG. 2). Thereupon, in this operation, the subsequent image data (the image data of FIGS. 4(c) to 4(f)) is not read out, and the results of the face detection are outputted (corresponds to step S129 of FIG. 2).

Thus, by performing arithmetic processing utilizing a DNN on the image data a predetermined number of lines at a time, it is possible to omit the readout of the image data beyond the moment that face detection succeeds and skip the execution of arithmetic processing. Accordingly, because it is possible to complete processing such as detection, recognition, and authentication in a short time period, a shortened processing time and reduced power consumption can be achieved.

Note that the predetermined number of lines is the number of lines determined according to the size of the filter which the algorithm of the learned learning model requires, and the minimum number of lines is one.

Furthermore, the image data read out from the imaging unit 11 may be image data which has been thinned in a column direction and/or row direction. In this case, when the image data is read out row by row in a column direction, for example, image data of the 2(N−1) (N is an integer of 1 or more)th line is read out.

Furthermore, in a case where the filter which the algorithm of the learned learning model requires is not line units but instead a rectangular region of pixel units such as 1×1 pixels or 5×5 pixels, for example, image data in a rectangular region corresponding to the shape and size of the filter, instead of image data of a predetermined number of lines, may be inputted to the DSP 14 as image data of a unit region which the DSP 14 subjects to arithmetic processing.

In addition, although a CNN and an RNN are illustrated as an example of a DNN, the present invention is not limited to such neural networks, rather, it is also possible to utilize another learning model such as a generative adversarial network (GAN), for example.

1.3 Execution of Additional Functions Utilizing Computation Results

Next, the operation when an additional function is executed by utilizing the results of the arithmetic processing executed by the DSP 14 will be described in detail with reference to the drawings. Note that, although an auto-exposure (AE) function, an autofocus (AF) function, an auto-shutter (AS) function, and an auto color correction function are illustrated hereinbelow as the additional functions executed by utilizing the computation results, the present disclosure is not limited to such functions, rather, a variety of functions may be adopted.

Figure 5:
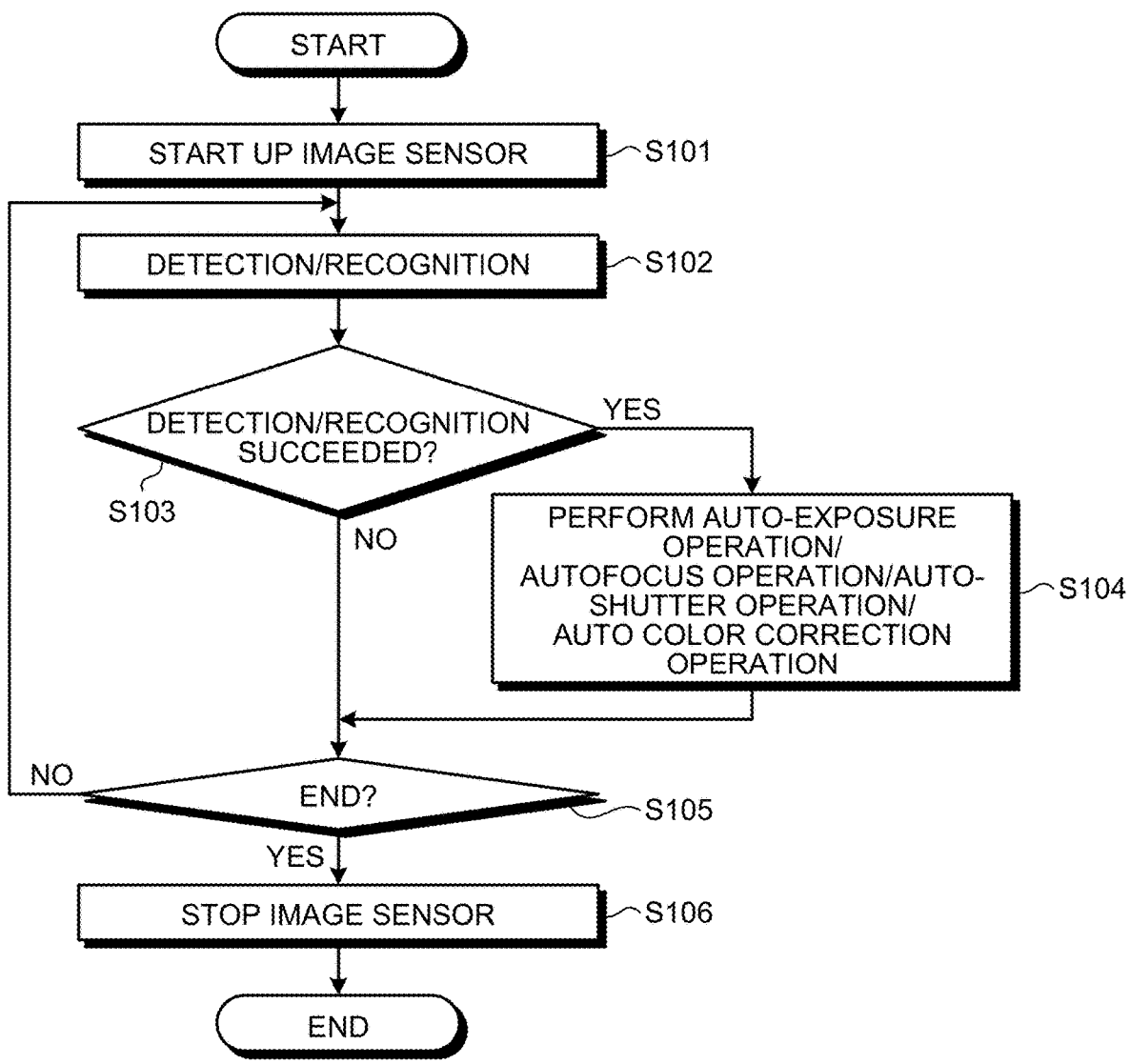
FIG. 5 is a flowchart illustrating an example of an operation when an additional function is executed by utilizing the results of arithmetic processing according to the first embodiment.

FIG. 5 is a flowchart illustrating an example of an operation when an additional function is executed by utilizing the results of arithmetic processing according to this embodiment. As illustrated in FIG. 5, in this operation, when the electronic device 1 starts up due to being powered on by the user, for example, the image sensor 10 is first started up (step S101). Thus, the displaying of an image which is obtained by the image sensor 10 on the display 17, which functions as the viewfinder of the electronic device 1, is started.

Next, by executing the operation illustrated using FIG. 2, the detection processing and recognition processing, and the like, through arithmetic processing are executed (step S102). For example, when the auto-exposure function is to be executed, the brightness of the person or thing, or the like (hereinafter called the subject), which is reflected onto the imaging unit 11, is detected by the arithmetic processing executed by the DSP 14. Furthermore, when the autofocus function is to be executed, the distance to the subject is detected by the arithmetic processing executed by the DSP 14. In addition, when the auto-shutter function is to be executed, the facial expression, posture, movement, and the like, of the subject are detected by the arithmetic processing executed by the DSP 14. In addition, when the auto color correction function is to be executed, the scene and the subject are detected by the arithmetic processing executed by the DSP 14. Note that scenes may include the weather such as sunshine and clouding, in addition to landscapes such as the sea or mountains.

Next, a determination is made whether or not the computation by the DSP 14 has succeeded, that is, whether or not a certain detection result, recognition result or the like has been obtained by the arithmetic processing (step S103). When the computation has succeeded (YES in step S103), functions which have been set to valid by the user are performed, for example (step S104).

For example, when the auto-exposure function is set to valid and the user presses the shutter button of the electronic device 1, the controller 12 (one embodiment of a function execution unit) automatically controls the diaphragm and shutter speed according to the brightness of the subject obtained through the arithmetic processing executed by the DSP 14.

Further, when the autofocus function has been set to valid, the controller 12 (one embodiment of the function execution unit) automatically controls the focal distance of the optical system 104 according to the distance to the subject obtained through the arithmetic processing executed by the DSP 14.

In addition, when the auto-shutter function has been set to valid, the controller 12 (one embodiment of the function execution unit) automatically performs a shutter operation according to the facial expression, posture, movement, and the like, of the subject obtained through the arithmetic processing executed by the DSP 14.

Furthermore, when the auto color correction function has been set to valid, the application processor 20 (one embodiment of the function execution unit) automatically updates the color matrix according to the scene and subject which have been detected through the arithmetic processing executed by the DSP 14. Note that the color matrix is not only changed for the whole image and may be updated for each region in which the subject is reflected. For example, for a region in which a person is reflected, a color matrix for people may be used, and for a region in which an object such as an apple or a mandarin can be seen, a color matrix that corresponds to the object may be used.

Thereafter, in step S105, a determination is made whether or not to end the operation, and when the operation is to be ended (YES in step S105), the image sensor 10 is stopped (step S106), and the operation is ended. On the other hand, when the operation is not to be ended (NO in step S105), the processing returns to step S102 and the foregoing operation is performed repeatedly.

1.4 Operation and Effect

Thus, according to this embodiment, by performing arithmetic processing on the image data a predetermined number of lines at a time, it is possible to omit the readout of the image data beyond the moment that the arithmetic processing succeeds and skip the execution of arithmetic processing. Accordingly, because it is possible to complete processing such as detection, recognition, and authentication in a short time period, a shortened processing time and reduced power consumption can be achieved.

Furthermore, by adopting a configuration in which additional functions are executed on the basis of the results of the arithmetic processing performed on the image data a predetermined number of lines at a time, it is possible to complete processing such as detection, recognition, and authentication in a short time period, and therefore a shortened processing time and reduced power consumption can be achieved.

In addition, because auto-exposure, autofocus, and auto color correction can be executed by detecting a scene and a subject in a short time period, it is also possible to acquire a more beautiful video or static image, depending on the scene and subject.

Moreover, because it is also possible to improve reaction speed when executing auto-shutter, the shutter can also be turned off automatically with more preferable timing.

2. Second Embodiment

Next, a second embodiment will be described in detail with reference to the drawings. In the foregoing first embodiment, a case is illustrated in which additional functions such as an auto-exposure (AE) function, an autofocus (AF) function, an auto-shutter (AS) function, and an auto color correction function are executed as use cases for the computation results. In contrast, in the second embodiment, a case is illustrated in which a rating or the like is automatically inputted to predetermined application software.

On YouTube (registered trademark), Twitter (registered trademark), Facebook (registered trademark), Instagram (registered trademark), and other such social networking services (SNS), and on internet forums, news sites, and blogs, and the like, there are cases where functions (social buttons) are incorporated to enable users to input a rating or a "like", and so forth, for content such as a video, a photograph, or text posted by another user. Therefore, in this embodiment, a case in which the facial expression of the user who is viewing or reproducing such content is recognized through arithmetic processing and, on the basis of the results, a rating, a like, or similar is automatically inputted, is described by way of an example.

The schematic configuration example of the electronic device according to this embodiment may be similar to the electronic device 1 described using FIG. 1 in the first embodiment. However, the electronic device according to this embodiment is a communication terminal that is provided with camera functions and content viewing/reproduction functions, such as a smartphone or a notebook-type personal computer.

2.1 Operation Example

Figure 6:
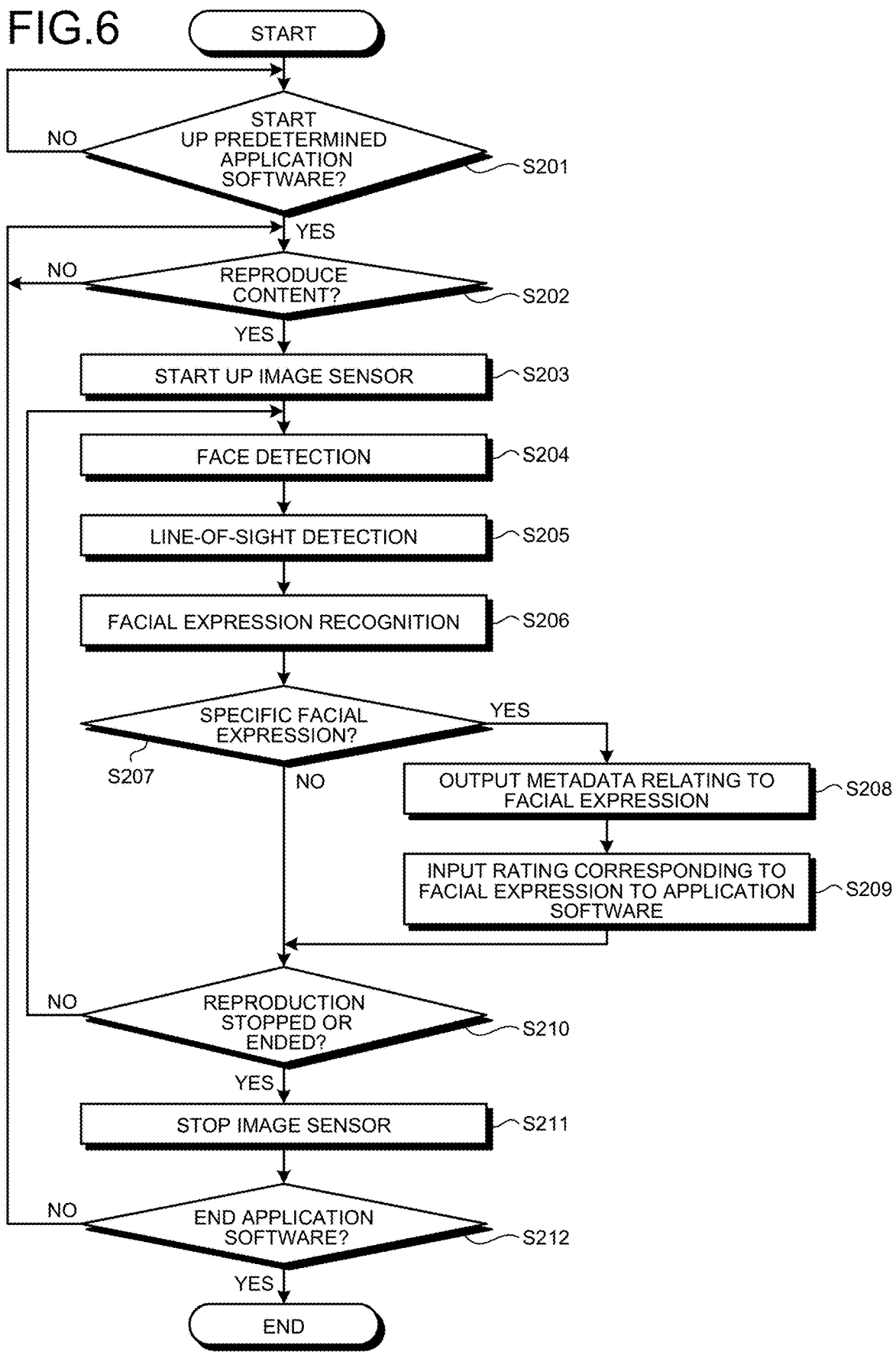
FIG. 6 is a flowchart illustrating an overall operation example of an electronic device according to a second embodiment.

FIG. 6 is a flowchart illustrating a schematic operation example of the electronic device according to this embodiment. Note that, for the sake of clarity in this description, a case is described in which video content provided by YouTube (registered trademark) or the like is reproduced.

As illustrated in FIG. 6, in this operation, the application processor 20 first starts up predetermined application software for content reproduction, in accordance with an operation inputted by the user (YES in step S201).

Next, the application processor 20 starts to reproduce the designated content in accordance with the operation inputted by the user (step S202). Then, the image sensor 10 is started up in sync with the content reproduction (step S203).

In accordance with the arithmetic processing described using FIG. 2 in the first embodiment, the image sensor 10, which has been started up, sequentially performs the arithmetic processing with respect to the user viewing the content, the arithmetic processing involving face detection (step S204), line-of-sight detection (step S205), and facial expression recognition (step S206), and, on the basis of the facial expression recognition results thus obtained, determines whether or not user is making a specific facial expression such as smiling, crying, or an angry expression (step S207).

When the user viewing the content is not making a specific facial expression (NO in step S207), the operation advances to step S210 without further processing. On the other hand, when the user is making a specific facial expression (YES in step S207), the image sensor 10 outputs, to the application processor 20, metadata relating to the facial expression recognized in step S206 (step S208). In contrast, the application processor 20 (one embodiment of the function execution unit) uses the social button in the application software being run to input a rating corresponding to the facial expression to the application software (step S209). Thereafter, the operation advances to step S210.

In step S210, the application processor 20 determines whether or not reproduction of this content has been stopped or has ended, and when same has not been stopped and has not ended (NO in step S210), the operation returns to step S204 and the subsequent operation is continued. On the other hand, when reproduction of the content has been stopped or has ended (YES in step S210), the application processor 20 stops the image sensor 10 (step S211). Continuing on, the application processor 20 determines whether or not the application software has ended (step S212), and when the same has ended (YES in step S212), the operation ends. On the other hand, when the application software has not ended (NO in step S212), the operation returns to step S202 and the subsequent operation is executed for reproduction of the next content.

2.2 Operation and Effect

As mentioned hereinabove, according to this embodiment, because it is possible to omit the readout of the image data beyond the moment that the facial expression recognition succeeds and skip the execution of arithmetic processing, an increase in the power consumption when viewing or reproducing content can be suppressed while a rating or a like for the content is automatically inputted. Note that, because the other configurations, operations, and effects may be the same as those of the foregoing embodiment, a detailed description is omitted here.

3. Third Embodiment

Next, a third embodiment will be described in detail with reference to the drawings. In this embodiment, a case is illustrated in which an electronic device provided with a function for rotating the display direction of the display 17 according to posture, such as a smartphone, controls the display direction of the display 17 by using the computation results, while running specific application software.

3.1 Schematic Configuration Example of Electronic Device

Figure 7:
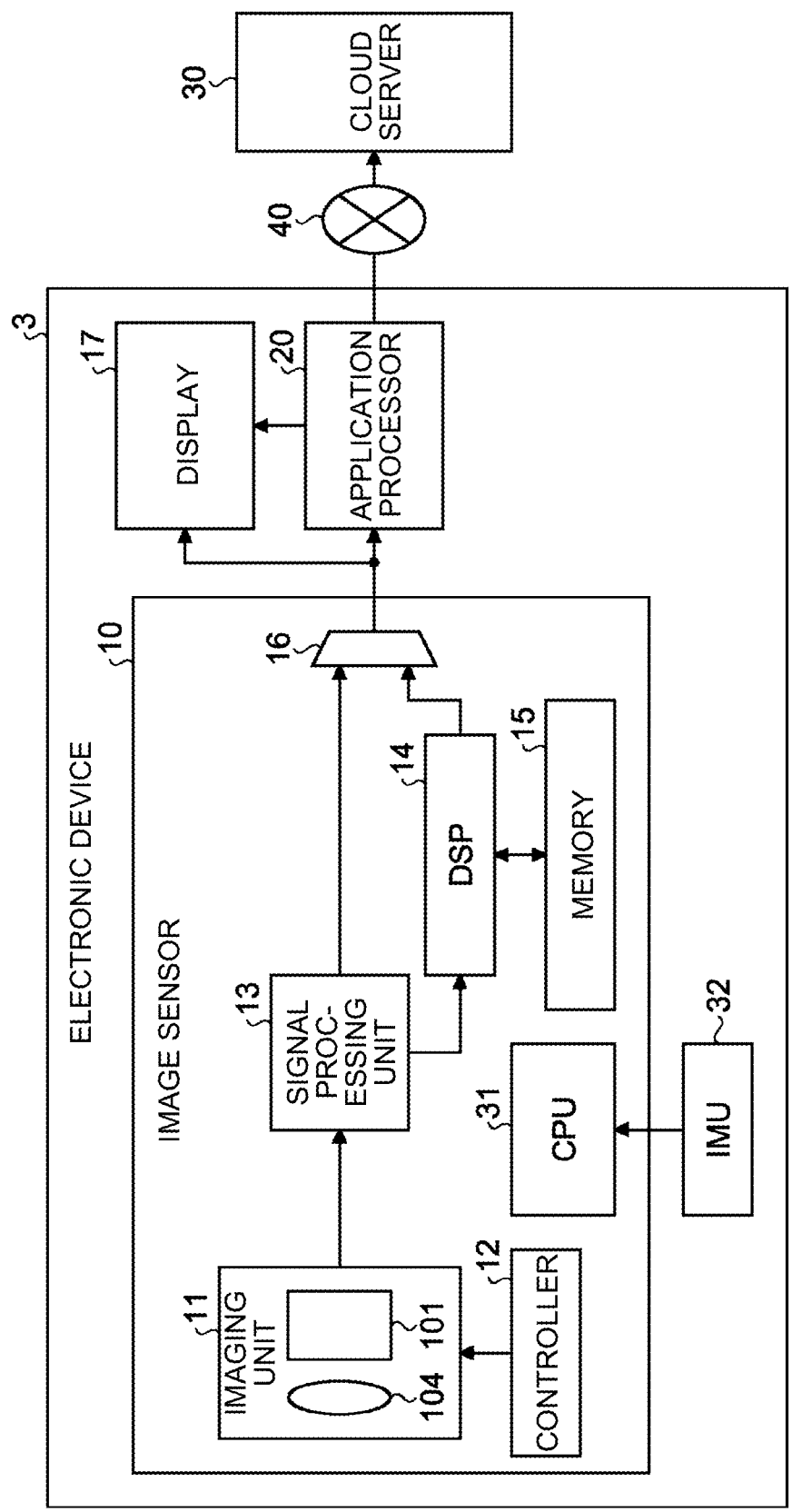
FIG. 7 is a block diagram illustrating a schematic configuration example of an electronic device according to a third embodiment.

FIG. 7 is a block diagram illustrating a schematic configuration example of an electronic device according to the third embodiment. As illustrated in FIG. 7, in addition to a configuration like that of the electronic device 1 described using FIG. 1 in the first embodiment, an electronic device 3 is further provided with an inertial measurement unit (IMU) 32 for detecting a change (hereinafter called displacement) in the posture of the electronic device 3. Furthermore, further incorporated into the image sensor 10 of the electronic device 3 is a central processing unit (CPU) 31 for detecting the posture of the electronic device 3 on the basis of the detection results by the IMU 32.

The IMU 32 is configured by using a triaxial gyro 3 and a triaxial accelerometer, for example, and outputs a three-dimensional angular velocity and acceleration as a detection result.

The CPU 31 detects what kind of posture the electronic device 3 has assumed relative to the direction of gravity, for example, on the basis of the detection result outputted from the IMU 32.

The application processor 20 controls the display direction of the display 17 according to the posture of the electronic device 3 detected by the CPU 31, for example. For example, when the display direction of the display 17 is not controlled on the basis of the arithmetic processing results, the application processor 20 places the display direction of the display 17 in a vertical direction in a state where the longitudinal direction of the electronic device 3 is closer to the vertical than the horizontal, and places the display direction of the display 17 in a lateral direction in a state where the longitudinal direction is closer to the horizontal than the vertical.

On the other hand, when the display direction of the display 17 is controlled on the basis of the arithmetic processing results, the application processor 20 controls the display direction of the display 17 so that the up-down direction of the face of the user obtained as a result of the arithmetic processing by the DSP 14 matches the display direction of the display 17. For example, despite the longitudinal direction of the electronic device 3 being in a state closer to the vertical than the horizontal, if the up-down direction of the face of the user is in a state of being closer to the horizontal than the vertical, the application processor 20 places the display direction of the display 17 in the same lateral direction as the up-down direction of the face of the user. On the other hand, despite the longitudinal direction of the electronic device 3 being in a state closer to the horizontal than the vertical, if the up-down direction of the face of the user is in a state of being closer to the vertical than the horizontal, the application processor 20 places the display direction of the display 17 in the same vertical direction as the up-down direction of the face of the user.

3.2 Operation Example

Figure 8:
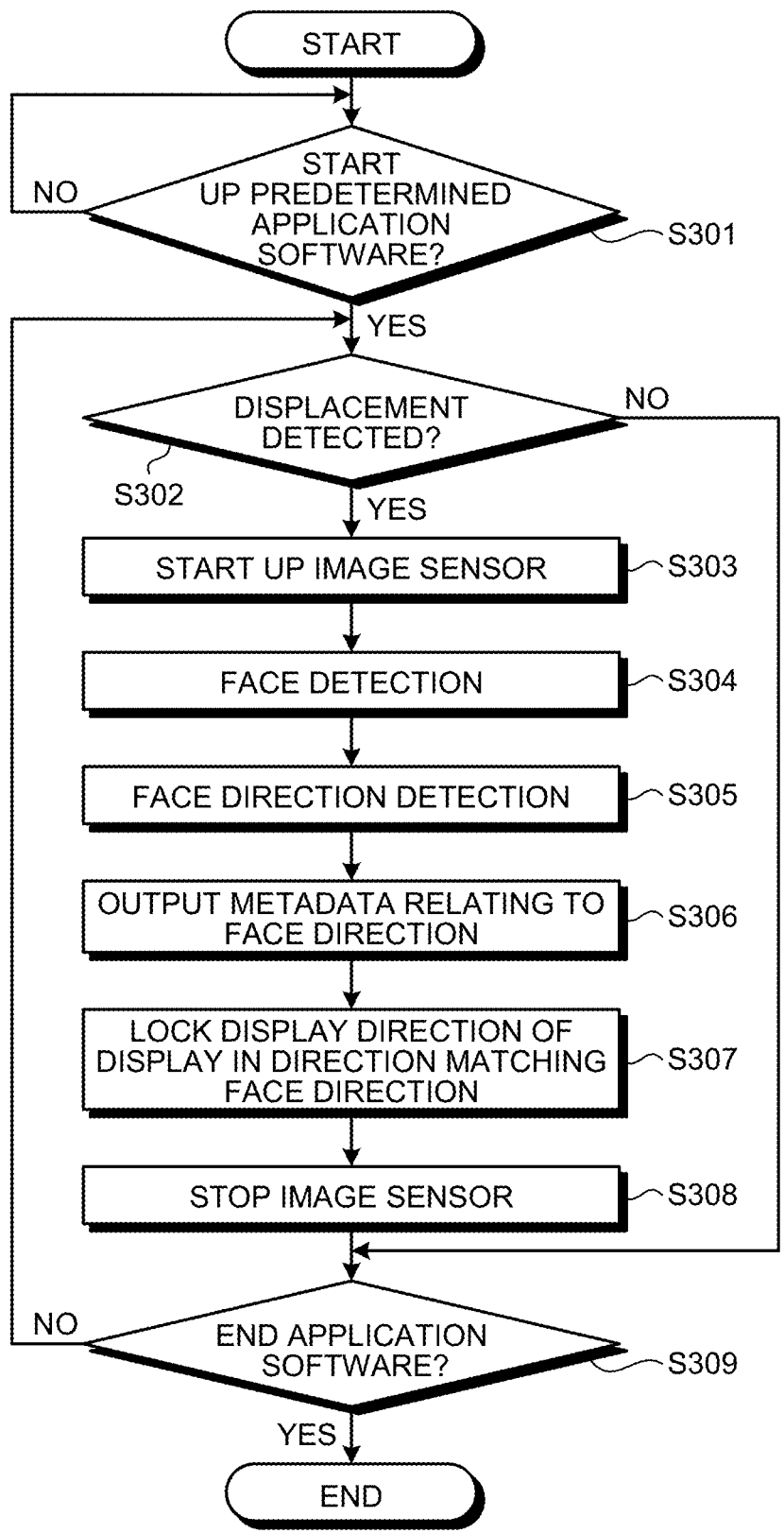
FIG. 8 is a flowchart illustrating a schematic operation example of the electronic device according to the third embodiment.

FIG. 8 is a flowchart illustrating a schematic operation example of the electronic device according to this embodiment. As illustrated in FIG. 8, in this operation, when the application processor 20 first starts up predetermined application software in accordance with an operation inputted by the user (YES in step S301), the CPU 31 detects variation in (displacement of) the posture of the electronic device 3 on the basis of information detected by the IMU 32 (step S302). When displacement is not detected (NO in step S302), the operation advances to step S309. On the other hand, when displacement is detected (YES in step S302), the image sensor 10 is started up (step S303).

In accordance with the arithmetic processing described using FIG. 2 in the first embodiment, the image sensor 10, which has been started up, sequentially performs the arithmetic processing with respect to the user using the electronic device 3, the arithmetic processing involving face detection (step S304) and face direction detection (step S305) and, on the basis of the face direction thus recognized, outputs, to the application processor 20, metadata relating to the up-down direction of the face of the user with respect to the imaging unit 11 or the display 17 (step S306). In contrast, the application processor 20 (one embodiment of the function execution unit) locks the display direction of the display 17 to a direction matching the up-down direction of the face of the user (step S307). The image sensor 10 is then stopped (step S308).

Subsequently, the application processor 20 determines whether or not the application software has ended (step S309), and when the same has ended (YES in step S309), the operation ends. On the other hand, when the application software has not ended (NO in step S309), the operation returns to step S302 and the subsequent operation is performed.

3.3 Operation and Effect

As per the foregoing, according to this embodiment, when a specific application software is being run, the display direction of the display 17 can be controlled according to the up-down direction of the face of the user on the basis of the results of the arithmetic processing that affords reduced processing time and power consumption. Because the other configurations, operations, and effects may be the same as those of the foregoing embodiments, a detailed description is omitted here.

Note that the detection results obtained by the IMU 32 can also be applied to the auto-shutter function, for example. As a specific example, the configuration may be such that, when the fact that the electronic device is idle is detected by the IMU 32 and CPU 31, for example, the shutter operation is performed automatically.

Furthermore, when an electronic device in which a light source operation is also undertaken during imaging, as in a Time-of-Flight (ToF) sensor, for example, is adopted as the electronic device, because the light source can be driven in sync with the timing at which imaging is performed by the image sensor 10 and on the basis of the detection results obtained by the IMU 32, it is possible to achieve further power savings by reducing the drive time period of the light source.

4. Fourth Embodiment

Next, a fourth embodiment will be described in detail with reference to the drawings. In this embodiment, a case is illustrated in which, in an electronic device with a built-in function for locking the screen displayed on the display 17 for security purposes or the like, such as a smartphone, the computation results are used when releasing the screen lock through face authentication.

4.1 Schematic Configuration Example of Electronic Device

Figure 9:
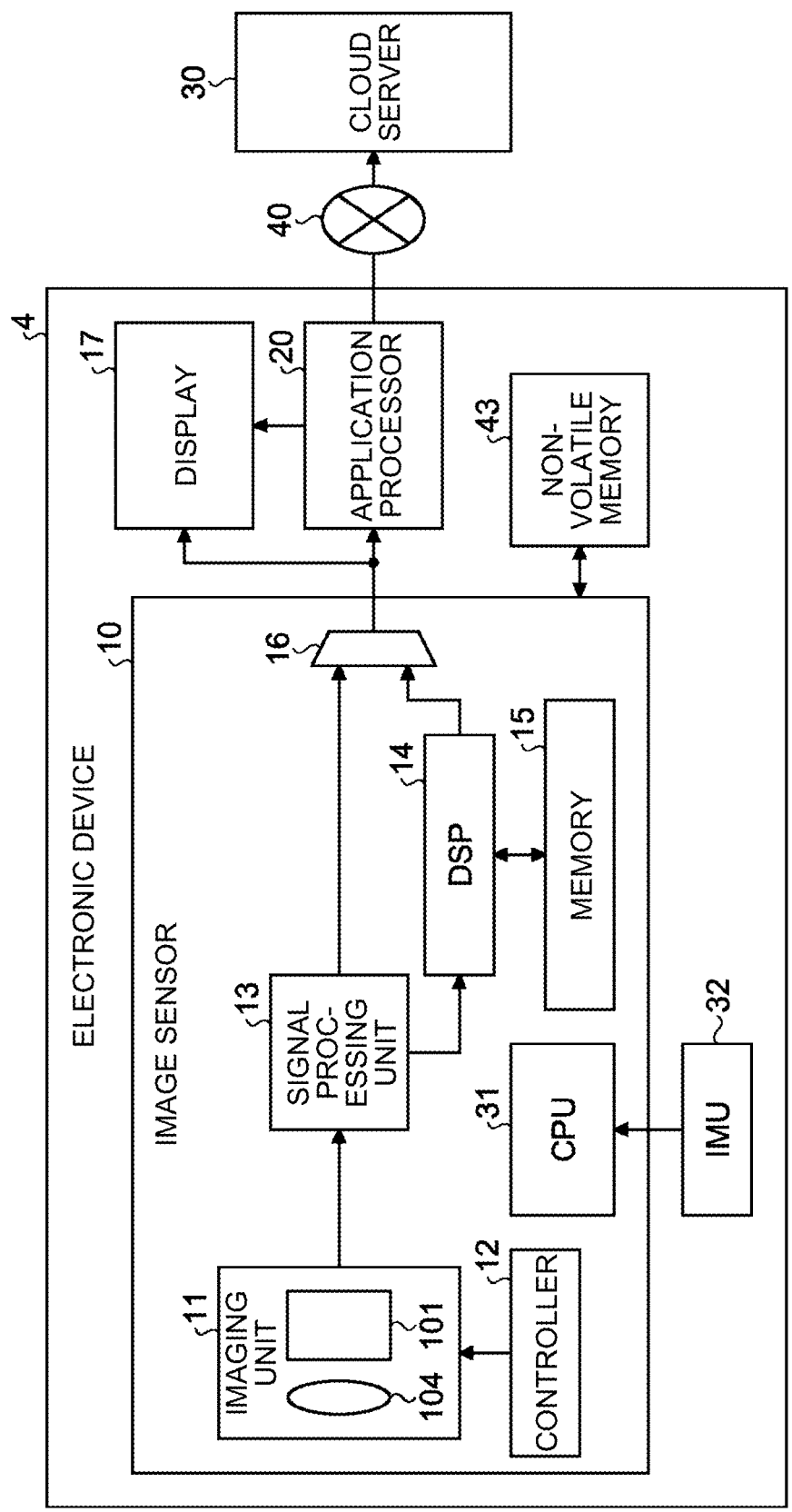
FIG. 9 is a block diagram illustrating a schematic configuration example of an electronic device according to a fourth embodiment.

FIG. 9 is a block diagram illustrating a schematic configuration example of an electronic device according to a fourth embodiment. As illustrated in FIG. 9, in addition to a configuration like that of the electronic device 3 described using FIG. 7 in the third embodiment, an electronic device 4 is further provided with a nonvolatile memory 43.

The nonvolatile memory 43 is constituted by a flash memory, for example, and stores, in a nonvolatile manner, authentication information that is to be used in face authentication and iris authentication. Note that, although a case is illustrated in FIG. 9 in which the nonvolatile memory 43 is provided outside the chip of the image sensor 10, the present invention is not limited to this arrangement, rather, the nonvolatile memory 43 may also be provided inside the chip of the image sensor 10.

4.2 Operation Example

Figure 10:
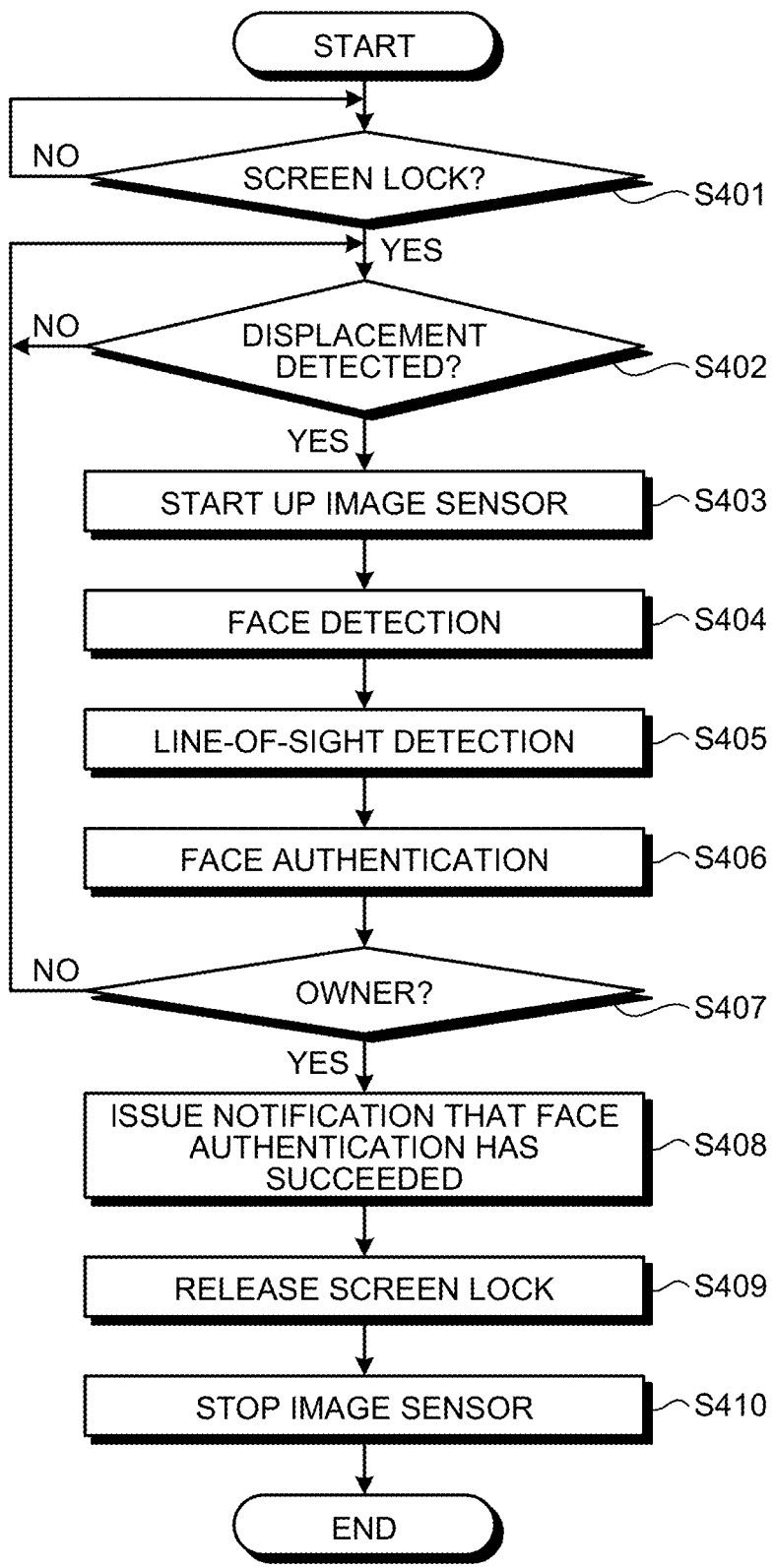
FIG. 10 is a flowchart illustrating a schematic operation example of the electronic device according to the fourth embodiment.

FIG. 10 is a flowchart illustrating a schematic operation example of the electronic device according to this embodiment. As illustrated in FIG. 10, in this operation, the application processor 20 first determines whether or not the electronic device 4 is in a screen lock state (step S401). Note that the screen lock of the electronic device 4 is executed by the application processor 20, for example. When the electronic device 4 is in a screen lock state (YES in step S401), the CPU 31 detects a variation (displacement) in the posture of the electronic device 1 on the basis of the information detected by the IMU 32 (step S402). Further, when displacement of the electronic device 4 is detected (YES in step S402), the image sensor 10 is started up (step S403).

In accordance with the arithmetic processing described using FIG. 2 in the first embodiment, the image sensor 10, which has been started up, sequentially performs the arithmetic processing with respect to the user using the electronic device 3, the arithmetic processing involving face detection (step S404), line-of-sight detection (step S405), and face authentication (step S406). Note that, in the face authentication of step S406, for example, the image sensor 10 determines whether or not the user currently operating the electronic device 4 is the owner of the electronic device 4 on the basis of face information specified from the image data which the image sensor 10 has inputted a predetermined number of lines at a time, and biometric information of the face of the owner which has been pre-stored in the nonvolatile memory 43.

When the face authentication of step S406 fails, for example when it is determined that the user currently operating the electronic device 4 is not the owner of the electronic device 4 (NO in step S407), the operation returns to step S402 while still maintaining the screen lock of the electronic device 4.

On the other hand, when the face authentication of step S406 succeeds, for example when it is determined that the user currently operating the electronic device 4 is the owner of the electronic device 4 (YES in step S407), the application processor 20 is notified by the image sensor 10 that the face authentication has succeeded (step S408).

The application processor 20 (one embodiment of the function execution unit), which has been notified that the face authentication has succeeded, releases the screen lock (step S409). Thereafter, the image sensor 10 is stopped (step S410), and the operation ends.

4.3 Operation and Effect

As per the foregoing, according to this embodiment, when displacement of the electronic device 4 is detected by the IMU 32, the screen lock is released on the basis of the results of the arithmetic processing that affords reduced processing time and power consumption. Furthermore, because during screen lock, the image sensor 10 usually no longer needs to be started up, it is also possible to further reduce power consumption during standby.

Note that, in the operation illustrated in FIG. 10, iris authentication may be executed instead of the face authentication in step S406. In this case, biometric information relating to the iris of the owner is pre-stored in the nonvolatile memory 43. Because the other configurations, operations, and effects may be the same as those of the foregoing embodiments, a detailed description is omitted here.

5. Fifth Embodiment

Next, a fifth embodiment will be described in detail with reference to the drawings. In this embodiment, a case where the electronic device 1 according to the first embodiment is applied to a security system, for example, is described by way of an example.

5.1 Schematic Configuration Example of Electronic Device

Figure 11:
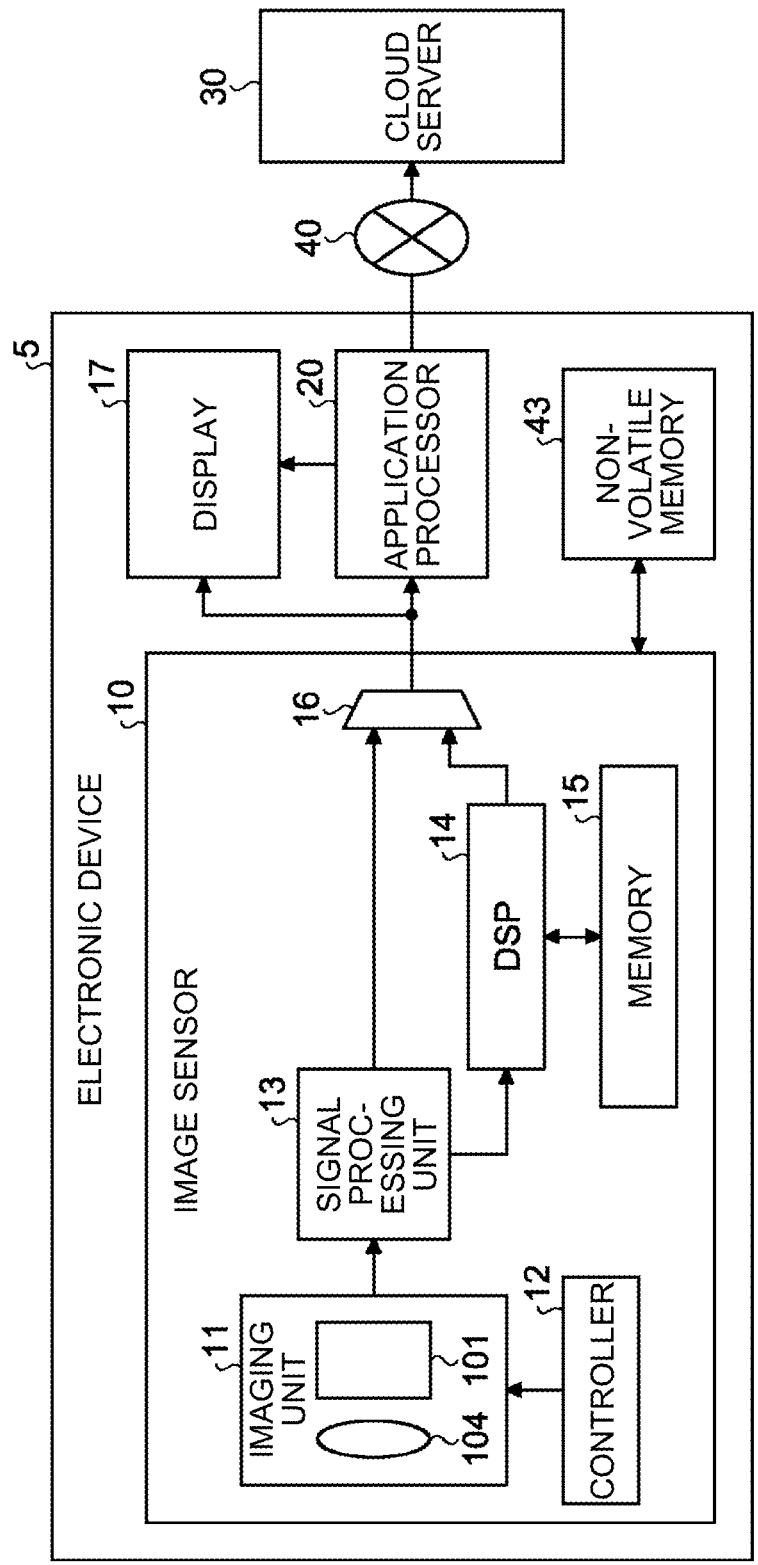
FIG. 11 is a block diagram illustrating a schematic configuration example of an electronic device according to a fifth embodiment.

FIG. 11 is a block diagram illustrating a schematic configuration example of an electronic device according to a fifth embodiment. As illustrated in FIG. 11, in addition to a configuration like that of the electronic device 1 described using FIG. 1 in the first embodiment, an electronic device 5 is further provided with a nonvolatile memory 43.

The nonvolatile memory 43 may be the nonvolatile memory 43 illustrated in the fourth embodiment, for example. However, the nonvolatile memory 43 stores biometric information for performing biometric authentication on a pre-registered person such as a family member or an employee, for example. Note that, although a case is illustrated in FIG. 11 in which the nonvolatile memory 43 is provided outside the chip of the image sensor 10, the present invention is not limited to this arrangement, rather, the nonvolatile memory 43 may also be provided inside the chip of the image sensor 10.

5.2 Operation Example

Figure 12:
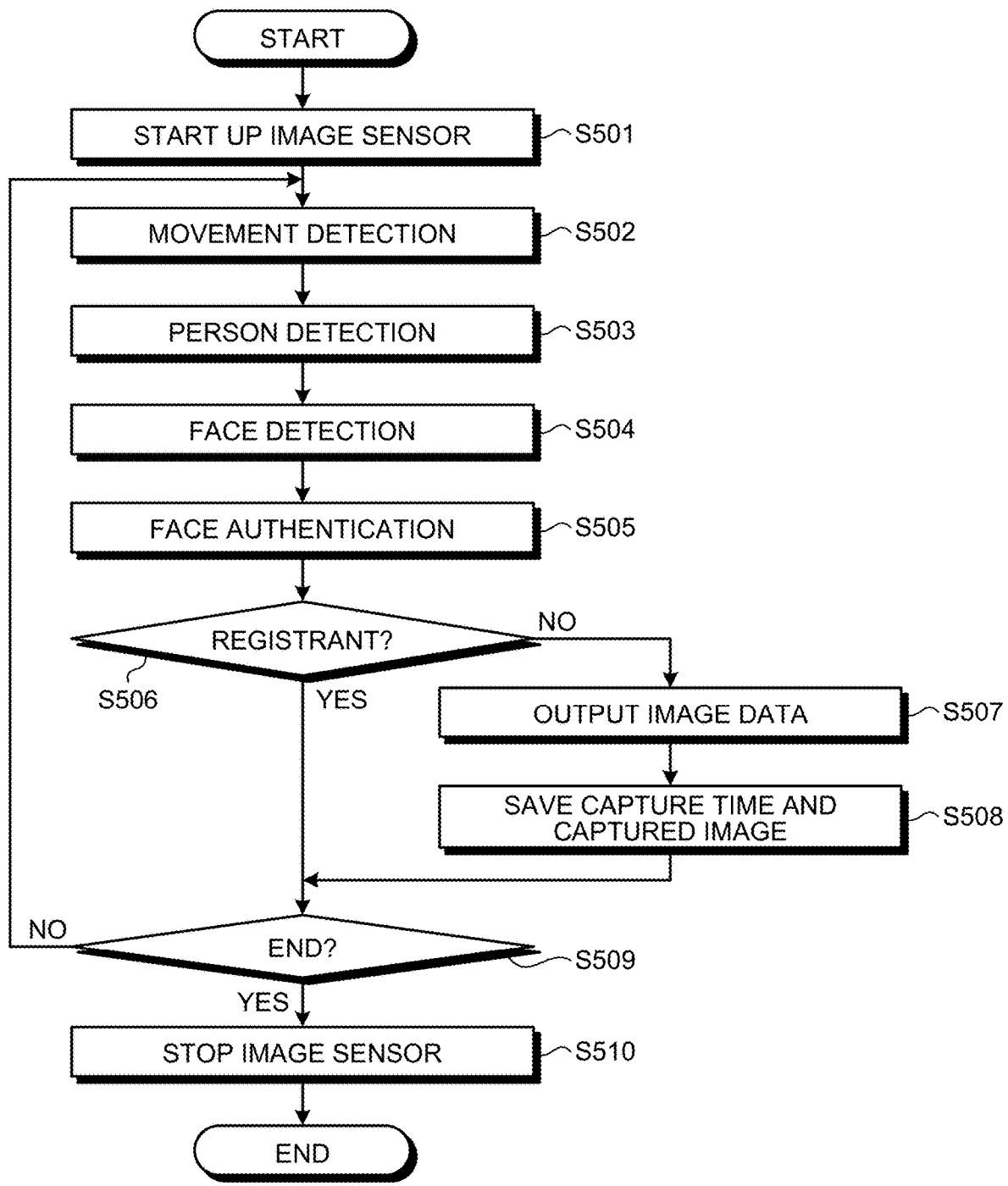
FIG. 12 is a flowchart illustrating a schematic operation example of the electronic device according to the fifth embodiment.

FIG. 12 is a flowchart illustrating a schematic operation example of the electronic device according to this embodiment. As illustrated in FIG. 12, in this operation, when the electronic device 1 starts up due to being powered on by the user, for example, the image sensor 10 is first started up (step S501).

In accordance with the arithmetic processing described using FIG. 2 in the first embodiment, the image sensor 10, which has been started up, sequentially performs arithmetic processing involving movement (moving object) detection (step S502), person detection (step S503), face detection (step S504), and face authentication (step S505).

When the face authentication of step S505 fails, for example when it is determined that the person reflected in the image data acquired by the image sensor 10 is not a registrant registered in the nonvolatile memory 43 (NO in step S506), the captured image is outputted from the image sensor 10 to the application processor 20 (step S507). In contrast, the application processor 20 (one embodiment of the function execution unit) saves, in the nonvolatile memory 43, for example, the captured image outputted from the image sensor 10 and the time the captured image was captured (step S508). Note that, instead of saving the captured image and the capture time in the nonvolatile memory 43, the application processor 20 may alternatively save the captured image and the capture time in the nonvolatile memory 43 and also transmit same to an external cloud server 30 via a network 40.

Thereafter, for example, a determination is made by the application processor 20 whether or not to end the operation (step S509), and when the operation is to be ended (YES in step S509), the operation ends after the image sensor 10 is stopped (step S510). On the other hand, when the operation is not to be ended (NO in step S509), the operation returns to step S502.

5.3 Operation and Effect

As per the foregoing, according to this embodiment, it is possible to determine whether or not an imaged person is a suspicious person on the basis of the results of the arithmetic processing that affords reduced processing time and power consumption. Note that, because the other configurations, operations, and effects may be the same as those of the foregoing embodiment, a detailed description is omitted here.

6. Sixth Embodiment

Next, a sixth embodiment will be described in detail with reference to the drawings. In this embodiment, a case where the electronic device 1 according to the first embodiment is applied to a surveillance camera for watching over a pet in a specific region in a household or the like, for example, is described by way of an example.

6.1 Schematic Configuration Example of Electronic Device

Figure 13:
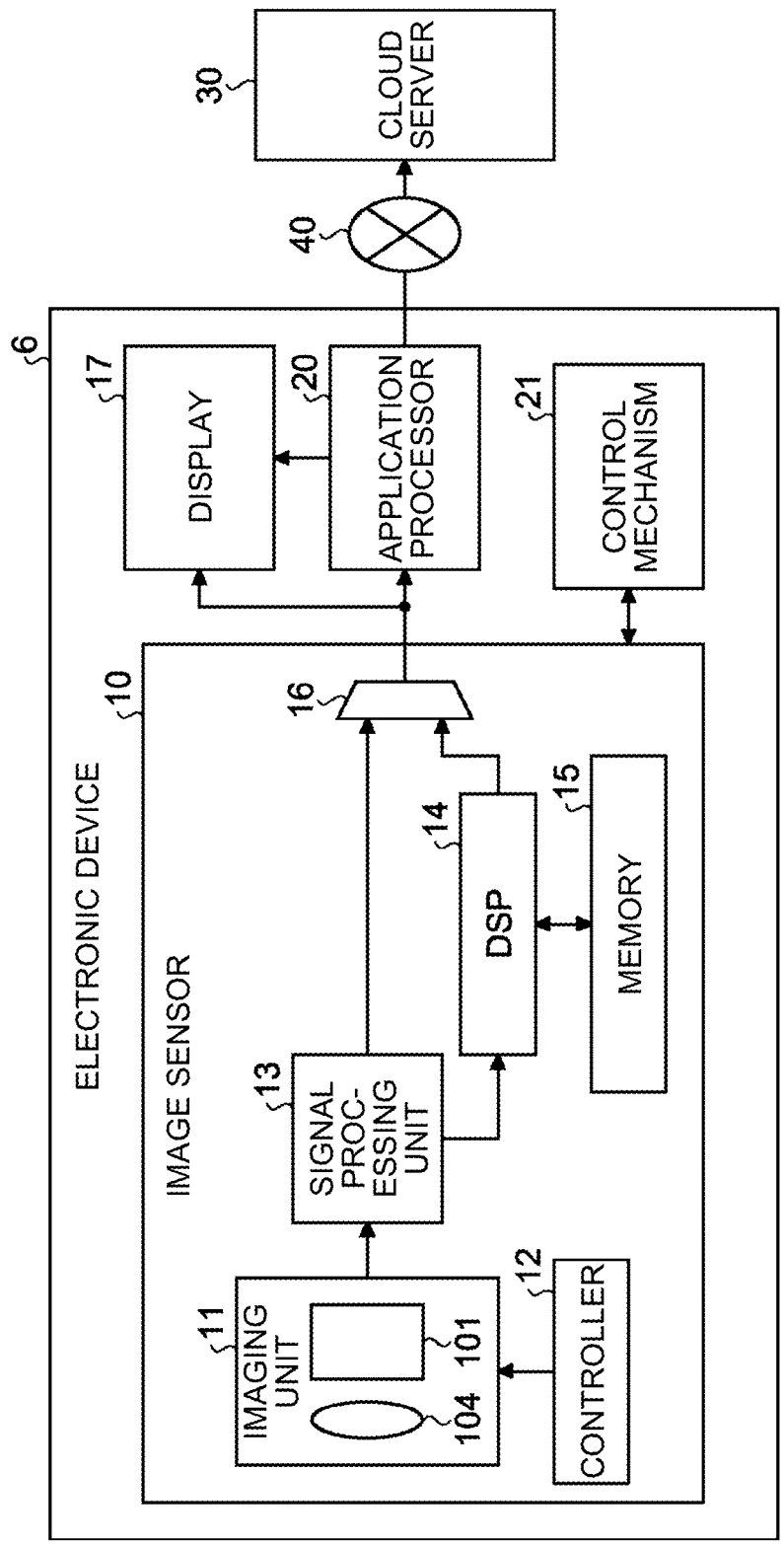
FIG. 13 is a block diagram illustrating a schematic configuration example of an electronic device according to a sixth embodiment.

FIG. 13 is a block diagram illustrating a schematic configuration example of an electronic device according to a sixth embodiment. As illustrated in FIG. 13, in addition to a configuration like that of the electronic device 1 described using FIG. 1 in the first embodiment, an electronic device 6 has a built-in control mechanism 21 that changes the angle of view in order to track a pet that is moving.

6.2 Operation Example

Figure 14:
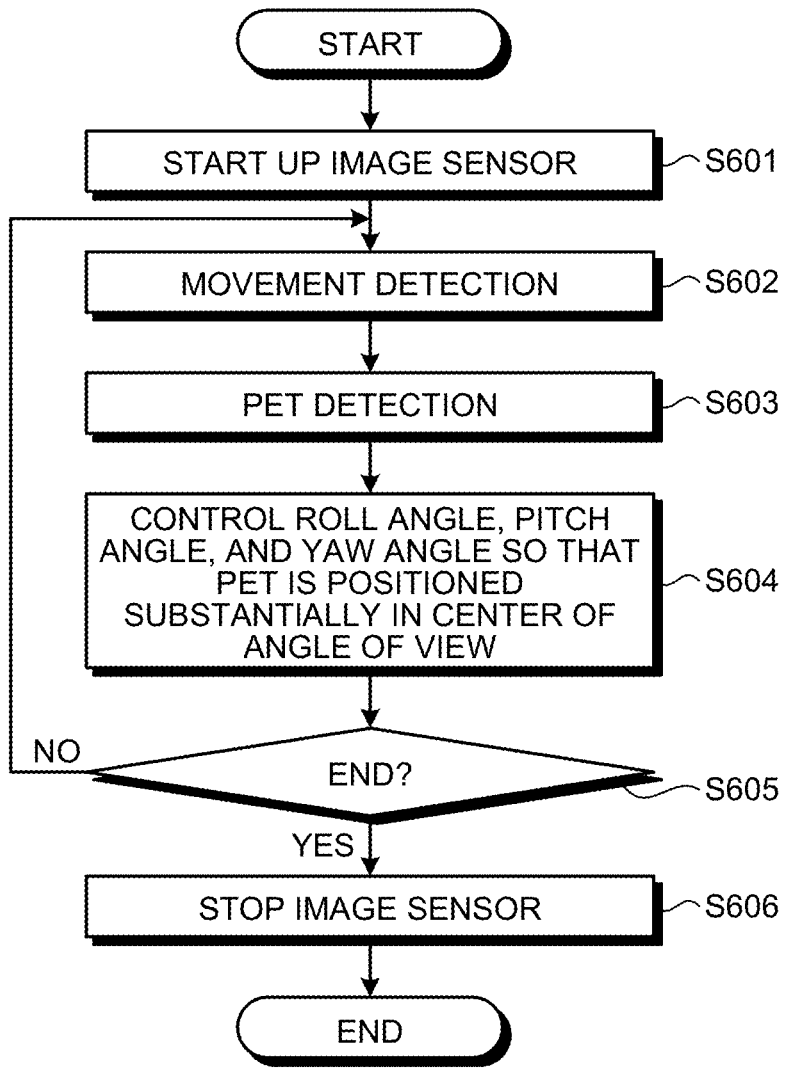
FIG. 14 is a flowchart illustrating a schematic operation example of the electronic device according to the sixth embodiment.

FIG. 14 is a flowchart illustrating a schematic operation example of the electronic device according to this embodiment. As illustrated in FIG. 14, in this operation, when the electronic device 6 starts up due to being powered on by the user, for example, the image sensor 10 is first started up (step S601).

In accordance with the arithmetic processing described using FIG. 2 in the first embodiment, the image sensor 10, which has been started up, sequentially executes arithmetic processing involving movement (moving object) detection (step S602) and pet detection (step S603), and controls the roll angle, pitch angle, and/or yaw angle of the electronic device 1 by driving a control mechanism 21 (one embodiment of the function execution unit) so that a pet detected through this processing is positioned substantially in the center, for example, of the angle of view (step S604).

Thereafter, for example, a determination is made by the application processor 20 whether or not to end the operation (step S605), and when the operation is to be ended (YES in step S605), the operation ends after the image sensor 10 is stopped (step S606). On the other hand, when the operation is not to be ended (NO in step S605), the operation returns to step S602.

6.3 Operation and Effect

As per the foregoing, according to this embodiment, it is possible to watch over a pet in a specific region in a household or the like, on the basis of the results of the arithmetic processing that affords reduced processing time and power consumption. Note that, because the other configurations, operations, and effects may be the same as those of the foregoing embodiment, a detailed description is omitted here.

7. Seventh Embodiment

Next, a seventh embodiment will be described in detail with reference to the drawings. In this embodiment, a case where the electronic device 1 according to the first embodiment is applied to a surveillance camera for watching over a child, an elderly person, or a person requiring nursing care (hereinafter called the person of interest) in a specific region in a household or the like, for example, is described by way of an example.

The schematic configuration example of the electronic device according to this embodiment may be similar to the electronic device 1 described using FIG. 1 in the first embodiment or to the electronic device 6 described using FIG. 13 in the sixth embodiment.

7.1 Operation Example

Figure 15:
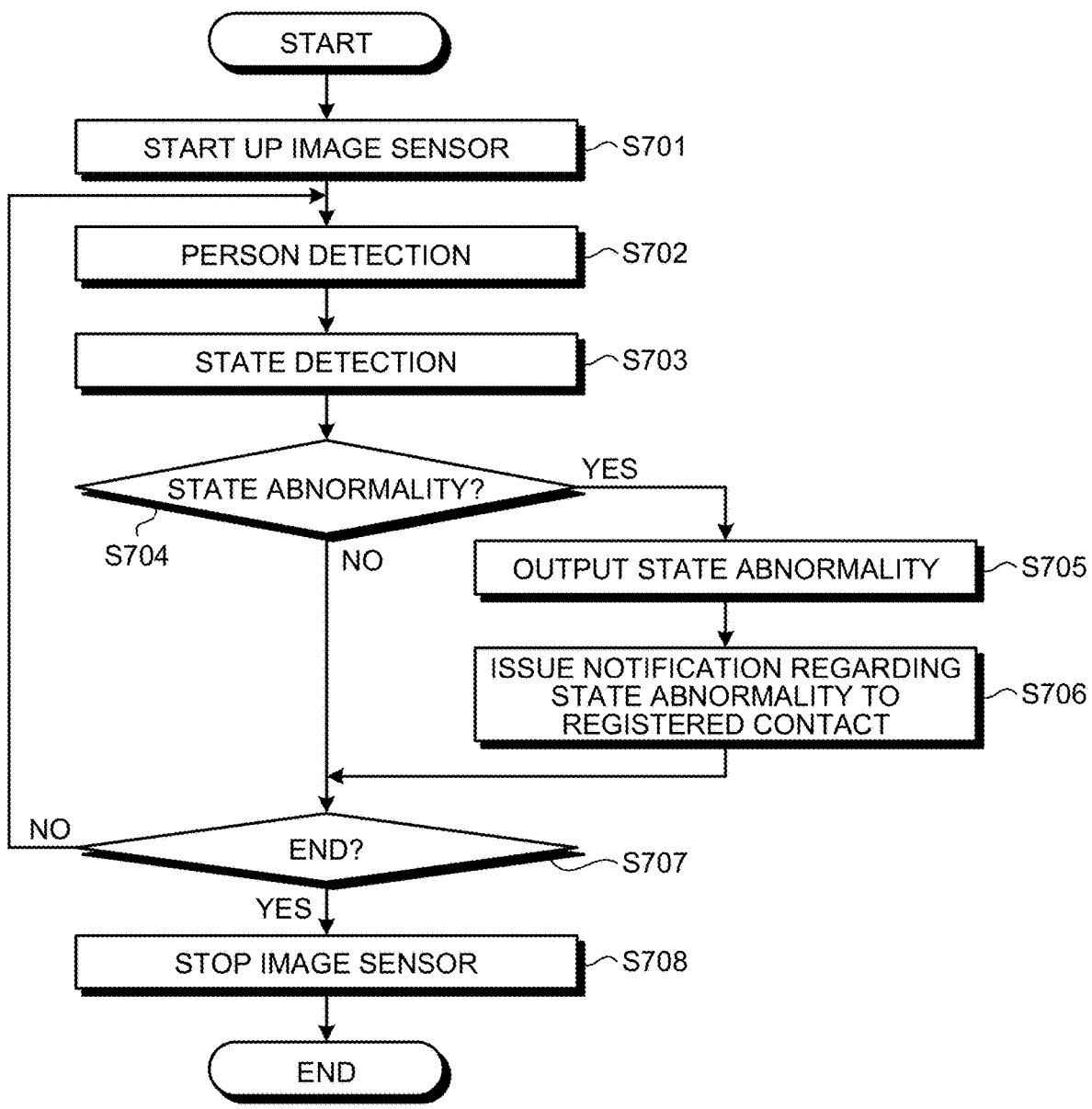
FIG. 15 is a flowchart illustrating a schematic operation example of an electronic device according to a seventh embodiment.

FIG. 15 is a flowchart illustrating a schematic operation example of the electronic device according to this embodiment. As illustrated in FIG. 15, in this operation, when the electronic device 1 starts up due to being powered on by the user, for example, the image sensor 10 is first started up (step S701).

In accordance with the arithmetic processing described using FIG. 2 in the first embodiment, the image sensor 10, which has been started up, sequentially performs arithmetic processing involving person detection (step S702) and state detection (step S703).

When a state abnormality in the person of interest is not detected in the state detection of step S703 (NO in step S704), the operation advances to step S707. On the other hand, when a state abnormality is detected (YES in step S704), metadata indicating the state abnormality is outputted from the image sensor 10 to the application processor 20 (step S705). Note that a state abnormality may be a state which is different from normal, such as a state where a person has been making gestures to call for help, where they have been crying for a long time, where they have assumed an unnatural posture and have not moved for a certain period or more, or where they are lying down in a place which is not a place where they should be lying (in the kitchen, for example), and so forth.

The application processor 20 (one embodiment of the function execution unit), which has been thus notified of a state abnormality, notifies a pre-registered contact, for example, that the state abnormality has been detected (step S706), and advances to step S707. Note that a pre-registered contact may be a relative of the person of interest or the email address or telephone number, or the like, of a contracted service company or the like, or may be the cloud server 30 which is connected via the network 40.

Thereafter, in step S707, for example, a determination is made by the application processor 20 whether or not to end the operation, and when the operation is to be ended (YES in step S707), the operation ends after the image sensor 10 is stopped (step S708). On the other hand, when the operation is not to be ended (NO in step S707), the operation returns to step S702.

7.2 Operation and Effect

As per the foregoing, according to this embodiment, it is possible to watch over a person of interest such as a child, an elderly person, or a person requiring nursing care in a specific region in a household or the like, on the basis of the results of the arithmetic processing that affords reduced processing time and power consumption. Note that, because the other configurations, operations, and effects may be the same as those of the foregoing embodiment, a detailed description is omitted here.

8. Eighth Embodiment

Next, an eighth embodiment will be described in detail with reference to the drawings. In this embodiment, a case where the electronic device 1 according to the first embodiment, for example, is incorporated into an autonomous driving system installed in a vehicle such as an automobile, or an autonomous system installed in an autonomous moving body, or the like, such as an autonomous robot or a drone, for example, is described by way of an example.

The schematic configuration example of the electronic device according to this embodiment may be similar to the electronic device 1 described using FIG. 1 in the first embodiment. However, in this embodiment, the network 40 is an in-vehicle network, and the cloud server 30 is an information processing device constituting an autonomous driving system, for example.

8.1 Operation Example

Figure 16:
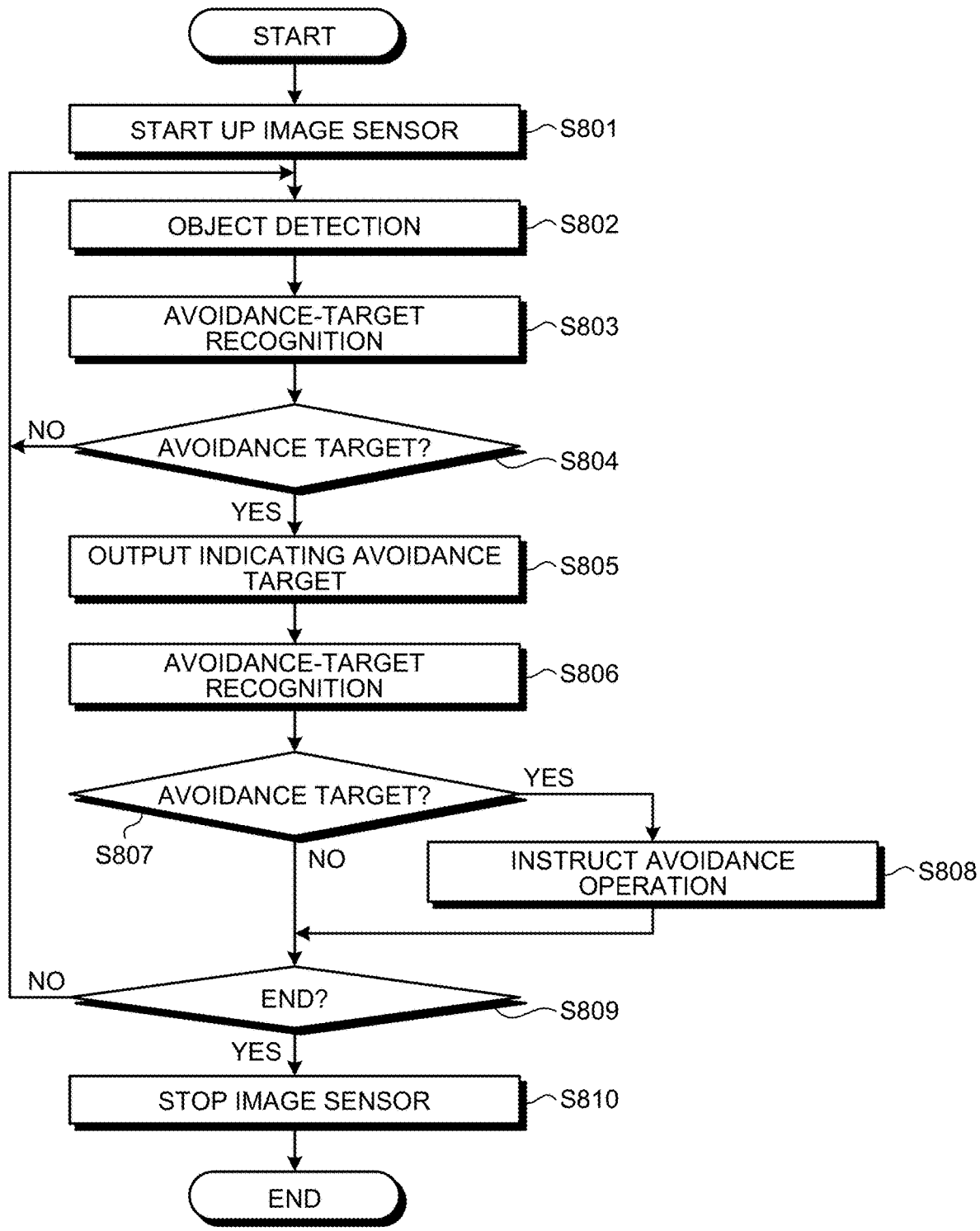
FIG. 16 is a flowchart illustrating a schematic operation example of an electronic device according to an eighth embodiment.

FIG. 16 is a flowchart illustrating a schematic operation example of the electronic device according to this embodiment. As illustrated in FIG. 16, in this operation, the image sensor 10 is started up in conjunction with the starting of the automobile engine by the driver, for example (step S801).

In accordance with the arithmetic processing described using FIG. 2 in the first embodiment, the image sensor 10, which has been started up, sequentially performs arithmetic processing involving the detection of an object within a certain distance (step S802) and recognition of whether or not the detected object is an avoidance target (step S803).

When it is recognized in the recognition of step S803 that the object is not an avoidance target (NO in step S804), this operation returns to step S802. On the other hand, when it is recognized that the object is an avoidance target (YES in step S804), image data, and metadata indicating that the object reflected in the image data is an avoidance target are outputted from the image sensor 10 to the application processor 20 (step S805).

The application processor 20, to which the image data and the metadata have been inputted, recognizes once again whether or not the object that has been notified as being an avoidance target is actually an avoidance target by analyzing the inputted image data, for example (step S806). When the object notified as being an avoidance target is not an avoidance target (NO in step S807), the operation advances to step S809 without further processing. On the other hand, when the object is recognized once again as an avoidance target (YES in step S807), the application processor 20 (one embodiment of the function execution unit) instructs the information processing device constituting the autonomous driving system to perform an avoidance operation to avoid the avoidance target (step S808), and advances to step S809.

In step S809, for example, a determination is made by the application processor 20 whether or not to end the operation, and when the operation is to be ended (YES in step S809), the operation ends after the image sensor 10 is stopped (step S810). On the other hand, when the operation is not to be ended (NO in step S809), the operation returns to step S802.

8.2 Operation and Effect

Thus, according to this embodiment, because it is possible to recognize an avoidance target on the basis of the results of arithmetic processing that affords reduced processing time and power consumption, rapid recognition of an avoidance target and reduced power consumption can be achieved by the autonomous driving system. Note that, because the other configurations, operations, and effects may be the same as those of the foregoing embodiment, a detailed description is omitted here.

Note that, although cases where the DSP 14 is made to operate as a processing unit have been illustrated in the foregoing first to eighth embodiments, the present invention is not limited to or by such cases. That is, as long as the processing obtains similar detection, recognition, or authentication results, the processing is not limited to learning model-based processing, rather, the DSP 14 can be made to execute a variety of processing.

9. Example of Application to Moving Body

The technology according to the present disclosure (the present technology) can be applied to various products. For example, the technology according to the present disclosure may be implemented as a device installed in any kind of moving body such as an automobile, an electric car, a hybrid electric car, a motorcycle, a bicycle, a personal mobility vehicle, a plane, a drone, a ship, or a robot.

Figure 17:
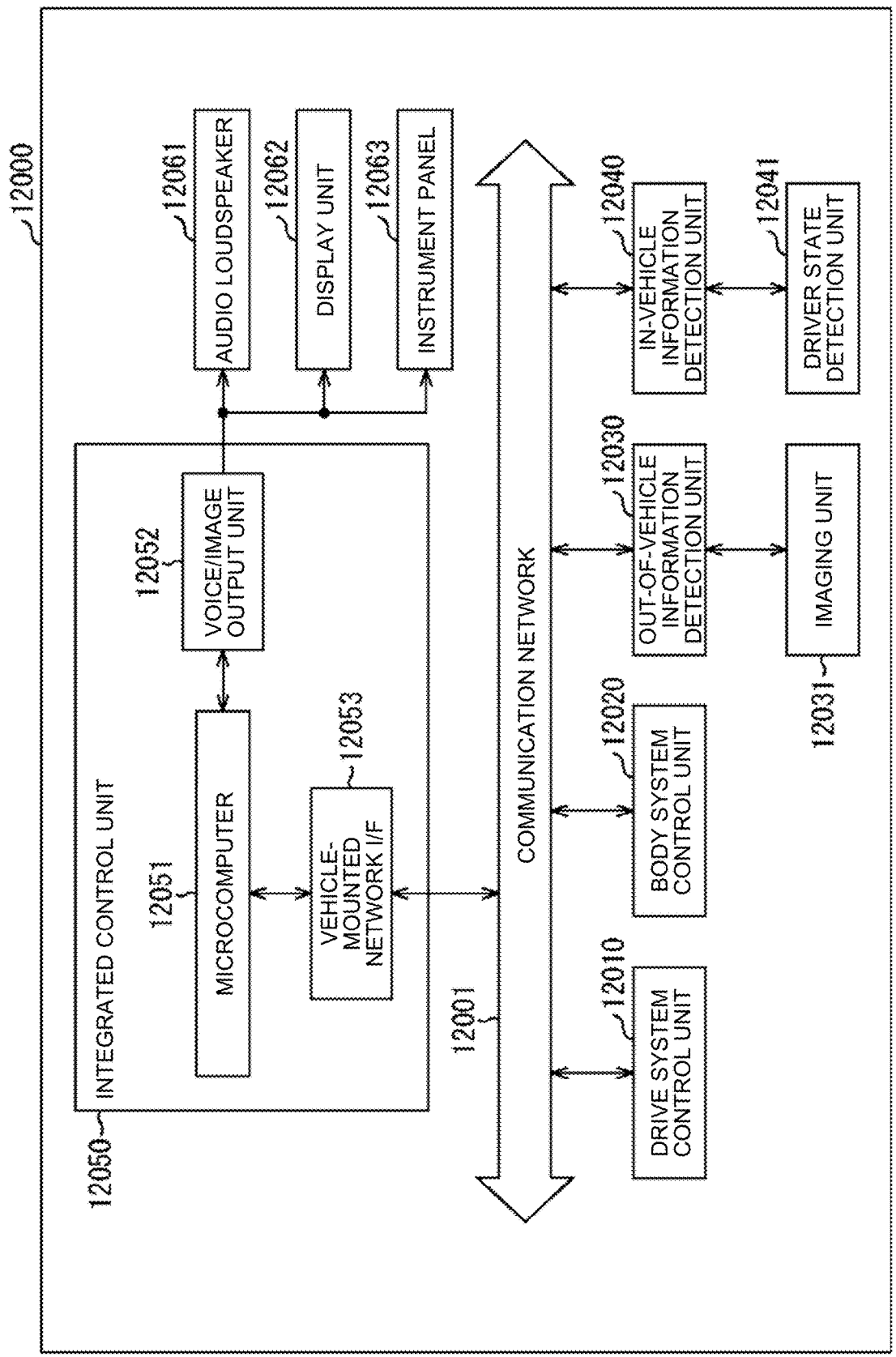
FIG. 17 is a block diagram illustrating a schematic configuration example of a vehicle control system.

FIG. 17 is a block diagram illustrating a schematic configuration example of a vehicle control system which is an example of a moving body control system to which the technology according to the present disclosure may be applied.

A vehicle control system 12000 is provided with a plurality of electronic control units connected via a communication network 12001. In the example illustrated in FIG. 17, the vehicle control system 12000 is provided with a drive system control unit 12010, a body system control unit 12020, an out-of-vehicle information detection unit 12030, an in-vehicle information detection unit 12040, and an integrated control unit 12050. Further, as a function configuration of the integrated control unit 12050, a microcomputer 12051, a voice/image output unit 12052, and a vehicle-mounted network interface (I/F) 12053 are illustrated.

The drive system control unit 12010 controls the operation of devices associated with the drive system of the vehicle, in accordance with various programs. For example, the drive system control unit 12010 functions as a control device of a driving force generation device for generating a vehicle driving force such as an internal combustion engine or a drive motor, a driving force transmission mechanism for transmitting a driving force to the wheels, a steering mechanism that adjusts the steering angle of the vehicle, a braking device for generating a vehicle braking force, or the like.

The body system control unit 12020 controls the operations of various devices installed in the vehicle body in accordance with various programs. For example, the body system control unit 12020 functions as a keyless entry system, a smart key system, a power window device, or a control device for various lights such as headlights, rear lights, brake lights, turn signals, or fog lights. In this case, radio waves or various switch signals which are transmitted from a mobile device substituting for a key may be inputted to the body system control unit 12020. The body system control unit 12020 receives the radio-wave or signal input and controls a door lock device, a power window device, and the lights, and so forth, of the vehicle.

An out-of-vehicle information detection unit 12030 detects information outside the vehicle in which the vehicle control system 12000 is installed. For example, an imaging unit 12031 is connected to the out-of-vehicle information detection unit 12030. The out-of-vehicle information detection unit 12030 causes the imaging unit 12031 to capture out-of-vehicle images and receives the captured images. The out-of-vehicle information detection unit 12030 may perform, on the basis of the received images, object detection processing or distance detection processing of people, vehicles, obstacles, traffic cones, or characters on a road surface, or the like.

The imaging unit 12031 is a light sensor that receives light and outputs an electrical signal corresponding to the amount of light received. The imaging unit 12031 is also capable of outputting an electrical signal as an image and of outputting the same as ranging information. Furthermore, the light received by the imaging unit 12031 may be visible light or may be non-visible light such as infrared radiation.

The in-vehicle information detection unit 12040 detects in-vehicle information. A driver state detection unit 12041 that detects the state of the driver, for example, is connected to the in-vehicle information detection unit 12040. The driver state detection unit 12041 includes a camera for imaging the driver, for example, and the in-vehicle information detection unit 12040 may calculate driver fatigue or the concentration level of the driver on the basis of the detected information inputted from the driver state detection unit 12041 or may discriminate whether the driver is falling asleep.

The microcomputer 12051 is capable of computing control target values for the driving force generator device, steering mechanism, or braking device on the basis of the in-vehicle information or out-of-vehicle information acquired by the out-of-vehicle information detection unit 12030 or the in-vehicle information detection unit 12040 and of outputting a control command to the drive system control unit 12010. For example, the microcomputer 12051 is capable of performing cooperative control for the purpose of realizing an advanced driver assistance system (ADAS) function that includes vehicle collision avoidance or shock absorption, inter-vehicular distance-based following, cruise control, vehicle collision warning, or vehicle lane departure warning, and so forth.

In addition, the microcomputer 12051 is capable of performing cooperative control for the purpose of autonomous driving or the like where travel is autonomous without the support of operations by the driver, by controlling the driving force generation device, steering mechanism, or braking device, or the like, on the basis of the information about the surroundings of the vehicle acquired by the out-of-vehicle information detection unit 12030 or the in-vehicle information detection unit 12040.

The microcomputer 12051 is also capable of outputting control commands to the body system control unit 12020 on the basis of the out-of-vehicle information acquired by the out-of-vehicle information detection unit 12030. For example, the microcomputer 12051 controls the headlights according to the position of a preceding vehicle or an oncoming vehicle which has been detected by the out-of-vehicle information detection unit 12030, and of performing cooperative control for the purpose of preventing headlight glare by switching from high beam to low beam, or the like.

The voice/image output unit 12052 transmits at least one of output signals of voice or image to an output device that is capable of reporting information visually or auditorily to a vehicle passenger or to outside the vehicle. In the example in FIG. 17, an audio loudspeaker 12061, a display unit 12062, and an instrument panel 12063 are illustrated as output devices. The display unit 12062 may include at least one of an on-board display or a head-up display, for example.

Figure 18:
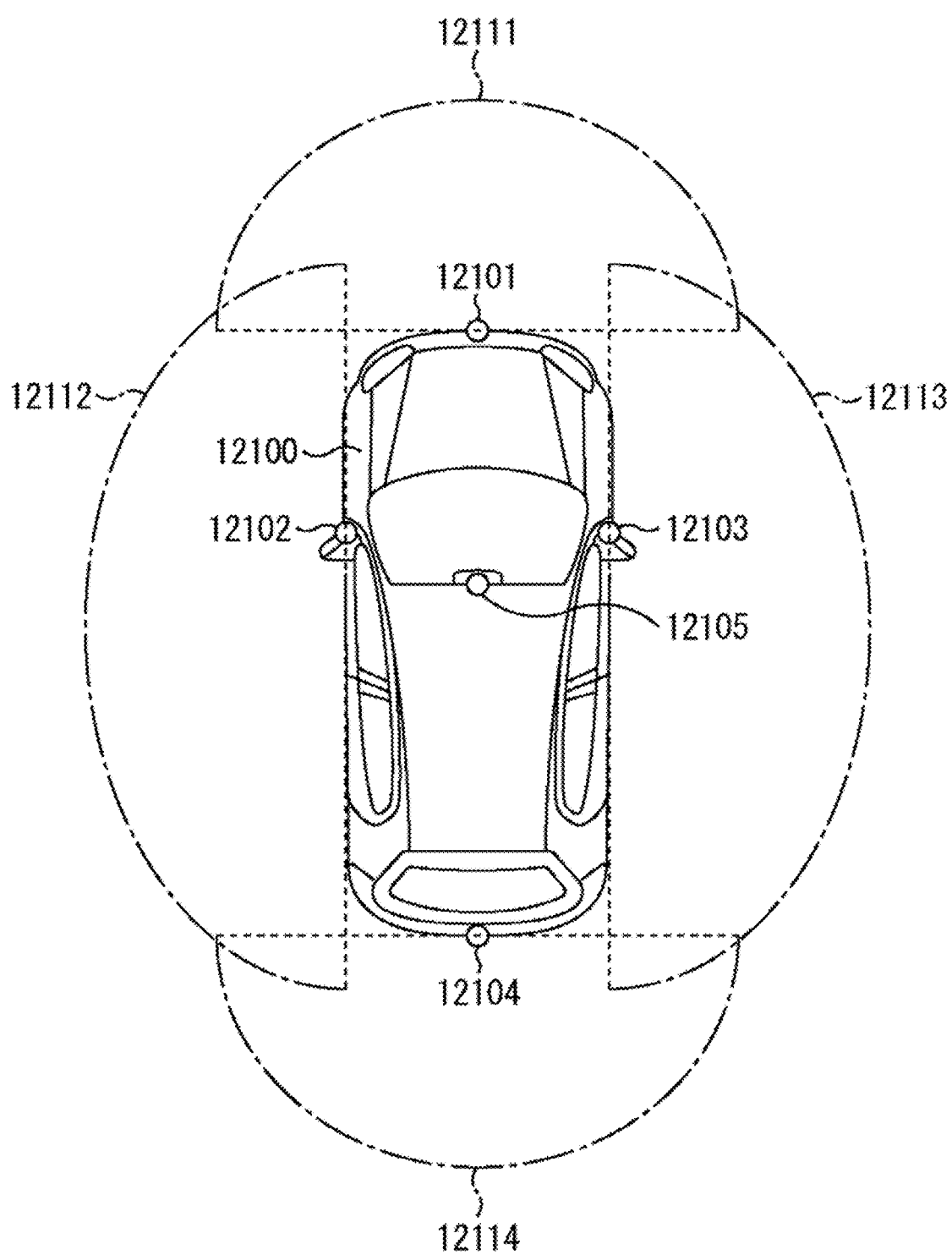
FIG. 18 is an explanatory drawing illustrating an example of the installation positions of an out-of-vehicle information detection unit and imaging units.

FIG. 18 is a diagram illustrating examples of the installation position of the imaging unit 12031.

In FIG. 18, imaging units 12101, 12102, 12103, 12104, and 12105 are included as the imaging unit 12031.

The imaging units 12101, 12102, 12103, 12104, and 12105 are provided in positions such as the front nose, the side mirrors, the rear bumper, the rear door of a vehicle 12100, and at the top of the windshield in the vehicle interior, for example. The imaging unit 12101 provided to the front nose and the imaging unit 12105 provided to the top of the windshield in the vehicle interior mainly acquire images at the front of the vehicle 12100. The imaging units 12102 and 12103 provided to the side mirrors mainly acquire images at the sides of the vehicle 12100. The imaging unit 12104 provided to the rear bumper or rear door mainly acquires images at the rear of the vehicle 12100. The imaging unit 12105 provided at the top of the windshield in the vehicle interior is mainly used to detect preceding vehicles, pedestrians, obstacles, traffic signals, traffic cones, or vehicle lanes, or the like.

Note that FIG. 18 illustrates an example of the imaging ranges of the imaging units 12101 to 12104. An imaging range 12111 indicates the imaging range of the imaging unit 12101 provided to the front nose, imaging ranges 12112 and 12113 indicate the imaging ranges of the imaging units 12102 and 12103 provided to the side mirrors, respectively, and an imaging range 12114 indicates the imaging range of the imaging unit 12104 provided to the rear bumper or rear door. For example, an overhead image in which the vehicle 12100 is seen from above is obtained by overlaying the image data captured by the imaging units 12101 to 12104.

At least one of the imaging units 12101 to 12104 may have a function to acquire distance information. For example, at least one of the imaging units 12101 to 12104 may be a stereo camera configured from a plurality of imaging elements or may be an imaging element that has pixels for phase difference detection.

For example, the microcomputer 12051 is capable of extracting, as a preceding vehicle, a three-dimensional object which is the closest three-dimensional object on the route of the vehicle 12100 in particular and which is traveling at a predetermined speed (equal to or greater than 0 km/h, for example) in substantially the same direction as the vehicle 12100, by finding the distance to each three-dimensional object in the imaging ranges 12111 to 12114 and a temporal change in this distance (relative speed with respect to the vehicle 12100), on the basis of distance information obtained from the imaging units 12101 to 12104. Furthermore, the microcomputer 12051 is capable of setting, in advance, the inter-vehicular distance to be secured in front of the preceding vehicle and of performing automatic braking control (also including follow/stop control) and automatic acceleration control (also including follow/start control), and so forth. The microcomputer 12051 is thus capable of cooperative control for the purpose of autonomous driving or the like where travel is autonomous without the support of operations by the driver.

For example, based on the distance information obtained from the imaging units 12101 to 12104, the microcomputer 12051 is capable of extracting three-dimensional object data relating to three-dimensional objects by classifying the same into motorcycles, ordinary vehicles, heavy-duty vehicles, pedestrians, telephone poles, and other such three-dimensional objects, and can be used in the automatic avoidance of obstacles. For example, the microcomputer 12051 identifies obstacles in the vicinity of the vehicle 12100 as obstacles that are visible to the driver of the vehicle 12100 and obstacles that are difficult to view. Further, the microcomputer 12051 determines a collision risk indicating the degree of risk of collision with each obstacle, and when the collision risk is equal to or greater than a set value and there is a possibility of collision, is capable of outputting a warning to the driver via the audio loudspeaker 12061 and the display unit 12062, and of performing driving assistance for collision avoidance by implementing forced deceleration and collision-avoidance steering via the drive system control unit 12010.

At least one of the imaging units 12101 to 12104 may have an infrared camera to detect infrared radiation. For example, the microcomputer 12051 is capable of recognizing pedestrians by determining whether there is a pedestrian in the images captured by the imaging units 12101 to 12104. This pedestrian recognition is performed, for example, by means of a procedure for extracting feature points in the images captured by the imaging units 12101 to 12104, which are configured as infrared cameras, and a procedure for discriminating pedestrians by performing pattern matching processing on a series of feature points representing an object contour. The microcomputer 12051 determines when a pedestrian is present in the images captured by the imaging units 12101 to 12104, and when a pedestrian is recognized, the voice/image output unit 12052 controls the display unit 12062 to produce a display in which a rectangular contour is superposed on the recognized pedestrian in order to highlight the same. Furthermore, the voice/image output unit 12052 may control the display unit 12062 to display an icon or the like representing the pedestrian, in a desired position.

An example of a vehicle control system to which the technology according to the present disclosure may be applied has been described hereinabove. The technology according to the present disclosure may be applied to the imaging unit 12031 and the like among the configurations described hereinabove. By applying the technology according to the present disclosure to the imaging unit 12031 and the like, it is possible to reduce the volume of data that is exchanged via the communication network 12001 and to reduce the amount of data to be processed in the out-of-vehicle information detection unit 12030 and integrated control unit 12050, and the like. Thus, because it is possible to rapidly acquire the results of recognition processing, detection processing, and the like, control of a vehicle 1200, provision of information to the driver, and so forth, can be implemented accurately and rapidly.

10. Example of Application to Endoscope Surgery System

The technology according to the present disclosure (the present technology) can be applied to various products. For example, the technology according to the present disclosure may be applied to an endoscope surgery system.

Figure 19:
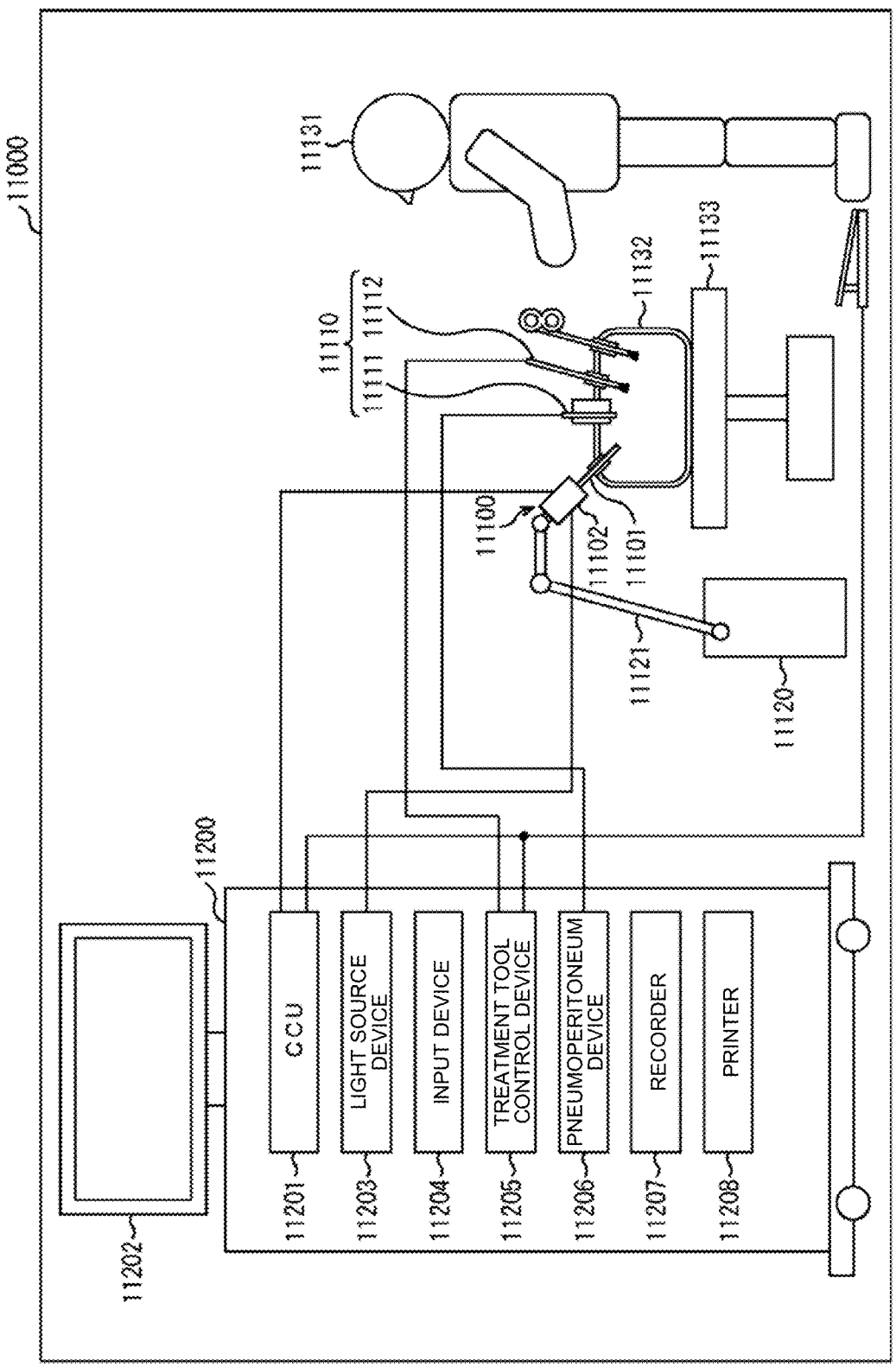
FIG. 19 is a diagram illustrating a schematic configuration example of an endoscope surgery system.

FIG. 19 is a diagram illustrating an example of a schematic configuration of an endoscope surgery system to which the technology according to the present disclosure (the present technology) may be applied.

FIG. 19 illustrates an aspect in which a surgeon (physician) 11131 uses an endoscope surgery system 11000 to perform surgery on a patient 11132 on a patient bed 11133. As illustrated, the endoscope surgery system 11000 is configured from an endoscope 11100; a pneumoperitoneum tube 11111, an energy treatment tool 11112, and another surgical tool 11110 thereof; a support arm device 11120 that supports the endoscope 11100; and a cart 11200 whereon various devices for endoscopic surgery are placed.

The endoscope 11100 is configured from a lens tube 11101, a region of a predetermined length of which is inserted into a body cavity of the patient 11132 from the tip of the endoscope; and a camera head 11102 connected to the base end of the lens tube 11101. Although an endoscope 11100 which has a rigid lens tube 11101 configured as a co-called rigid mirror is illustrated in the illustrated example, the endoscope 11100 may have a flexible lens tube and be configured as a so-called flexible mirror.

An opening into which an objective lens is fitted is provided at the tip of the lens tube 11101. A light source device 11203 is connected to the endoscope 11100, and the light generated by the light source device 11203 is guided to the tip of the lens tube by a light guide provided so as to extend inside the lens tube 11101, and is projected onto an observation object inside the body cavity of the patient 11132 via the objective lens. Note that the endoscope 11100 may be of the direct-view type or may be of the oblique-view type or side-view type.

An optical system and an imaging element are provided in the interior of the camera head 11102, and light (observation light) reflected by the observation object is focused on the imaging element by the optical system. The observation light is photoelectrically converted by the imaging element, and an electrical signal that corresponds to the observation light, that is, an image signal that corresponds to the observed image, is generated. The image signal is transmitted as RAW data to a camera control unit (CCU) 11201.

The CCU 11201 is configured from a central processing unit (CPU) or a graphics processing unit (GPU), or the like, and centrally controls the operation of the endoscope 11100 and of a display device 11202. The CCU 11201 also receives an image signal from the camera head 11102 and carries out various image processing on the image signal in order to display an image based on the image signal, such as development processing (mosaicing), for example.

The display device 11202 displays, under the control from the CCU 11201, an image which is based on the image signal that has undergone the image processing by the CCU 11201.

The light source device 11203 is configured from a light source such as a light emitting diode (LED), for example, and supplies illumination light to the endoscope 11100 when imaging a surgical site or the like.

An input device 11204 is an interface for inputs to the endoscope surgery system 11000. The user is able to input various information and input instructions to the endoscope surgery system 11000 via the input device 11204. For example, the user inputs an instruction, or the like, to change the conditions for imaging using the endoscope 11100 (the type of illumination light, the magnification, and the focal length, and the like).

A treatment tool control device 11205 controls the driving of the energy treatment tool 11112 for cauterization or incision of tissue, blood vessel sealing, or the like. A pneumoperitoneum device 11206 feeds gas into the body cavity via the pneumoperitoneum tube 11111 in order to expand the body cavity of the patient 11132 for the purpose of securing the field of view of the endoscope 11100 and for securing a workspace for the surgeon. A recorder 11207 is a device enabling various surgery-related information to be recorded. A printer 11208 is a device enabling various surgery-related information to be printed in various formats such as text, images, or graphs.

Note that the light source device 11203, which supplies illumination light to the endoscope 11100 when imaging a surgical site, can be configured from a white light source that is constituted by an LED, a laser light source, or a combination thereof, for example. When the white light source is constituted by a combination of RGB laser light sources, because it is possible to control the output intensity and output timing of each color (each wavelength) highly precisely, the white balance of the captured images can be adjusted in the light source device 11203. Furthermore, in this case, by projecting the laser light from the respective RGB laser light sources onto the observation object using time division and controlling the driving of the imaging element of the camera head 11102 in sync with the projection timing, it is also possible to use time division to capture images that correspond to the respective RGB. According to this method, a color image can be obtained even without providing a color filter to the imaging element.

Furthermore, the driving of the light source device 11203 may be controlled so that the intensity of the outputted light is changed at predetermined time intervals. By controlling the driving of the imaging element of the camera head 11102 in sync with the timing for changing the foregoing light intensity, and by acquiring images using time division and combining the images, it is possible to generate high-dynamic range images without so-called underexposure or overexposure.

The light source device 11203 may also be configured to be capable of supplying light in a predetermined wavelength band that corresponds to special light observation. In special light observation, so-called narrowband imaging, in which predetermined tissue such as a blood vessel of a mucous membrane surface layer, or the like, is imaged at high contrast, is performed by projecting narrowband light, versus illumination light (that is, white light) during normal observation, by utilizing the wavelength dependence of light absorption by the body tissue, for example. Alternatively, in special light observation, fluorescence observation, in which an image is obtained using fluorescent light generated by projecting excitation light, may be performed. In fluorescence observation, it is possible to project excitation light onto the body tissue and observe fluorescence from the body tissue (autofluorescence observation), or perform a local injection, into the body tissue, of a reagent such as indocyanine green (ICG), and project excitation light corresponding to the fluorescence wavelength of the reagent onto the tissue to obtain a fluorescent image, and so forth. The light source device 11203 may be configured capable of supplying narrowband light and/or excitation light that corresponds to such special light observation.

Figure 20:
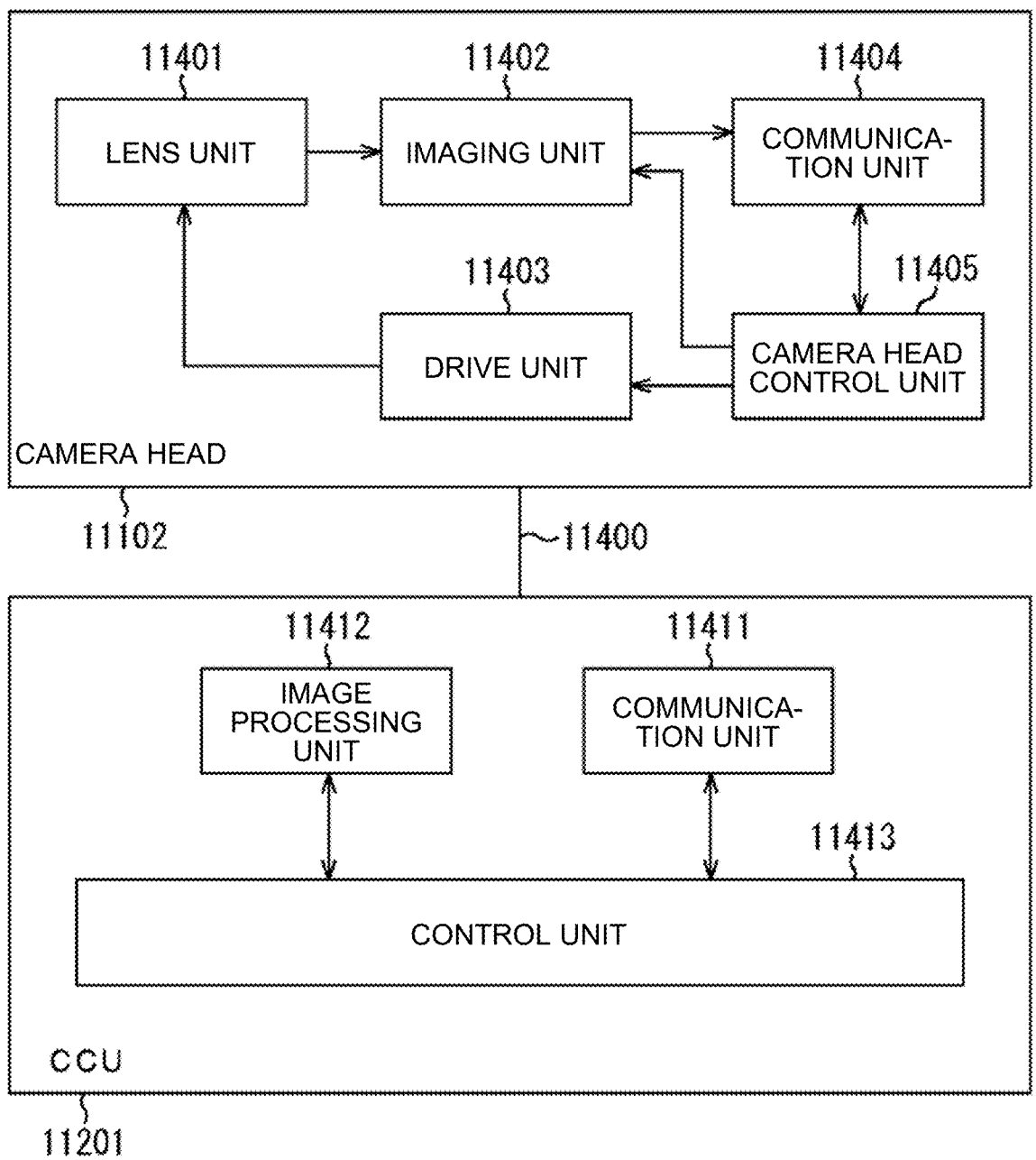
FIG. 20 is a block diagram illustrating an example of the function configurations of a camera head and a CCU.

FIG. 20 is a block diagram illustrating an example of the function configurations of the camera head 11102 and the CCU 11201 illustrated in FIG. 19.

The camera head 11102 has a lens unit 11401, an imaging unit 11402, a drive unit 11403, a communications unit 11404, and a camera head control unit 11405. The CCU 11201 has a communications unit 11411, an image processing unit 11412, and a control unit 11413. The camera head 11102 and the CCU 11201 are communicably connected to each other by a transmission cable 11400.

The lens unit 11401 is an optical system provided at the junction with the lens tube 11101. Observation light that is captured from the tip of the lens tube 11101 is guided to the camera head 11102 and enters the lens unit 11401. The lens unit 11401 is configured by combining a plurality of lenses including a zoom lens and a focusing lens.

There may be one imaging element constituting the imaging unit 11402 (a so-called single-plate type) or there may be a plurality thereof (a so-called multi-plate type). When the imaging unit 11402 is configured as a multi-plate type, image signals corresponding to the respective RGB are generated by the imaging elements, and a color image may be obtained by combining these image signals, for example. Alternatively, the imaging unit 11402 may be configured to have a pair of imaging elements for acquiring the respective image signals for the right eye and left eye corresponding to a three-dimensional (3D) display. Through the creation of a 3D display, the surgeon 11131 is able to more accurately ascertain the depth of the biological tissue of a surgical site. Note that, when the imaging unit 11402 is configured as a multi-plate type, the lens unit 11401 may also be provided as a plurality of systems to correspond to each of the imaging elements.

Furthermore, the imaging unit 11402 does not necessarily need to be provided to the camera head 11102. For example, the imaging unit 11402 may be provided immediately after the objective lens and inside the lens tube 11101.

The drive unit 11403 is configured by an actuator and, under the control from the camera head control unit 11405, moves the zoom lens and focusing lens of the lens unit 11401 by a predetermined distance along the optical axis. Accordingly, the magnification and the focal point of the images captured by the imaging unit 11402 may be suitably adjusted.

The communications unit 11404 is configured by a communication device for exchanging various information with the CCU 11201. The communications unit 11404 transmits image signals obtained from the imaging unit 11402 to the CCU 11201 via the transmission cable 11400 as RAW data.

Furthermore, the communications unit 11404 receives, from the CCU 11201, a control signal for controlling the driving of the camera head 11102, and supplies this signal to the camera head control unit 11405. The control signal contains information relating to the imaging conditions such as information designating the frame rate of the captured images, information designating the exposure value during imaging, and/or information designating the magnification and focal point of the captured images, for example.

Note that the imaging conditions such as the frame rate, exposure value, magnification, and focal point may be suitably designated by the user, or may be automatically set by the control unit 11413 of the CCU 11201 on the basis of the acquired image signals. In the latter case, a so-called auto-exposure (AE) function, autofocus (AF) function, and auto white balance (AWB) function are built into the endoscope 11100.

The camera head control unit 11405 controls the driving of the camera head 11102 on the basis of the control signal from the CCU 11201 received via the communications unit 11404.

The communications unit 11411 is configured by a communication device for exchanging various information with the camera head 11102. The communications unit 11411 receives the image signals transmitted from the camera head 11102 via the transmission cable 11400.

Further, the communications unit 11411 transmits a control signal for controlling the driving of the camera head 11102 to the camera head 11102. The image signals and the control signals can be transmitted using electrical communication or optical communication, or the like.

The image processing unit 11412 executes various image processing with respect to the RAW-data image signals transmitted from the camera head 11102.

The control unit 11413 performs various controls related to the imaging of the surgical site and so forth by the endoscope 11100 and the displaying of the captured images obtained by the imaging of the surgical site and so forth. For example, the control unit 11413 generates a control signal for controlling the driving of the camera head 11102.

Further, the control unit 11413 causes the display device 11202 to display captured images in which the surgical site and so forth are visible, on the basis of the image signals which have undergone the image processing by the image processing unit 11412. Thereupon, the control unit 11413 may use various image recognition techniques to recognize various objects in the captured images. For example, by detecting the shapes, colors, and the like, of the edges of the objects contained in the captured images, the control unit 11413 is capable of recognizing surgical instruments such as forceps, specific body parts, hemorrhages, and mist when using the energy treatment tool 11112, and the like. When causing the display device 11202 to display the captured images, the control unit 11413 may cause the display device to use the recognition results to display various surgery support information by superposing the same on the images of the surgical site. As a result of the surgery support information being displayed in a superposed manner and presented to the surgeon 11131, it is possible to alleviate the burden on the surgeon 11131, and the surgeon 11131 is able to proceed with the surgery reliably.

The transmission cable 11400 connecting the camera head 11102 to the CCU 11201 is an electrical signal cable suited to electrical signal communications, an optical fiber suited to optical communications, or a composite cable thereof.

Here, in the illustrated example, although communications are performed in a wired manner using the transmission cable 11400, communications between the camera head 11102 and the CCU 11201 may also be performed wirelessly.

An example of an endoscope surgery system to which the technology according to the present disclosure may be applied has been described hereinabove. The technology according to the present disclosure may be applied to the imaging unit 11402 and the like of the camera head 11102, for example, among the configurations described hereinabove. A reduction in the amount of data to be processed by the CCU 11201 and the like can be reduced by applying the technology according to the present disclosure to the imaging unit 11402. Thus, because the image processing results can be acquired more rapidly, the setting and updating of the imaging conditions such as the frame rate, exposure value, magnification, and focal point, as well as the provision of information to the user, and so forth, can be performed accurately and rapidly.

Note that, although an endoscope surgery system has been described here by way of an example, the technology according to the present disclosure may also be applied elsewhere, such as to a microsurgery system, for example.

Although embodiments of the present disclosure have been described hereinabove, the technical scope of the present disclosure is not limited to or by the foregoing embodiments, rather, various modifications can be made within a scope not departing from the spirit of the present disclosure. Moreover, the constituent elements throughout the different embodiments and modification examples may also be suitably combined.

Further, the effects in each of the embodiments described in the present specification are merely intended to be illustrative and are not limited; other effects are also possible.

In addition, each of the foregoing embodiments may be used individually or may be used in combination with another embodiment.

Note that the present disclosure may also adopt the following configurations.

(1)
An electronic device, comprising:
an imaging unit that generates image data;
a processing unit that executes neural network calculation model-based processing with respect to image data-based data that is read out from the imaging unit;
a function execution unit that performs a predetermined function on the basis of the results of the processing; and
a detection unit that detects displacement,
wherein the processing unit executes the processing when the detection unit detects displacement.

(2)
The electronic device according to (1),
wherein the function execution unit comprises a function for setting/releasing a screen lock of the electronic device,
wherein, when the detection unit detects displacement of the electronic device in a state where the screen lock of the electronic device has been set, the processing unit performs face authentication using the neural network calculation model on the image data-based data read out from the imaging unit, and
wherein, when the face authentication by the processing unit succeeds, the function execution unit releases the screen lock of the electronic device.

(3)
The electronic device according to (1) or (2),
wherein the function execution unit comprises a function for rotating the display direction of the screen of the electronic device,
wherein, when the detection unit detects displacement of the electronic device, the processing unit performs face direction detection using the neural network calculation model on the image data-based data read out from the imaging unit, and
wherein the function execution unit controls the display direction of the screen of the electronic device according to an up-down direction of a face detected by the processing unit.

(4)
The electronic device according to any one of (1) to (3), wherein the processing unit executes processing utilizing a convolution neural network (CNN) with respect to data of an initially inputted unit region of the image data-based data of an identical frame.

(5)
The electronic device according to (4),
wherein, when the processing utilizing the CNN with respect to the data of the initially inputted unit region fails, the processing unit executes processing utilizing a recurrent neural network (RNN) with respect to data of a unit region which is inputted next of the image data-based data of the identical frame.

(6)
The electronic device according to (4) to (5), further comprising:
a controller that reads out image data from the imaging unit in line units,
wherein the data of the unit region is the line-unit data of the image data-based data, and
wherein the data is inputted to the processing unit in the line units.

(7)
The electronic device according to (4) or (5), wherein the data of the unit region is a predetermined number of lines' worth of data of the image data-based data.

(8)
The electronic device according to (4) or (5), wherein the data of the unit region is data of a rectangular region of the image data-based data.

(9)
The electronic device according to any one of (1) to (8), further comprising:
a memory that records a program of the neural network calculation model,
wherein the processing unit executes the processing by reading out the program from the memory and executing the program.

(10)
The electronic device according to any one of (1) to (9), wherein the processing is at least one of face detection, face authentication, line-of-sight detection, facial expression recognition, face direction detection, object detection, object recognition, movement detection, pet detection, scene recognition, state detection, and avoidance-target recognition.

(11)

The electronic device according to (10),
wherein the face detection is processing to detect the face of a person contained in the image data,
wherein the face authentication is processing to authenticate whether or not the face of the person contained in the image data matches the face of a pre-registered person,
wherein the line-of-sight detection is processing to detect the direction of the line of sight of the person contained in the image data,
wherein the facial expression recognition is processing to recognize the facial expression of the person contained in the image data,
wherein the face direction detection is processing to detect the up-down direction of the face of the person contained in the image data,
wherein the object detection is processing to detect an object contained in the image data,
wherein the object recognition is processing to recognize an object contained in the image data,
wherein the movement detection is processing to detect a moving object contained in the image data,
wherein the pet detection is processing to detect a pet contained in the image data,
wherein the scene recognition is processing to recognize a scene when acquiring the image data,
wherein the state detection is processing to detect the state of a person or an object contained in the image data, and
wherein the avoidance-target recognition is processing to recognize an object which is an avoidance target contained in the image data.

(12)

The electronic device according to any one of (1) to (11), wherein the predetermined function is at least one of an auto-exposure function, an autofocus function, an auto-shutter function, and an auto color correction function.

(13)

The electronic device according to any one of (1) to (11),
wherein the function execution unit is provided with a function for executing application software for reproducing content with which a social button for inputting a user rating is associated,
wherein, during reproduction of the content by the application software, the processing unit performs facial expression recognition using the neural network calculation model with respect to the image data-based data read out from the imaging unit, and
wherein the function execution unit uses the social button to input a rating for the content according to the facial expression recognized by the processing unit.

(14)

The electronic device according to (2), (10) or (11), further comprising:
a nonvolatile memory that stores biometric information used in the face authentication,
wherein the processing unit performs the face authentication by using the biometric information read out from the nonvolatile memory.

(15)

The electronic device according to any one of (1) to (14),
wherein the processing unit performs face authentication using the neural network calculation model with respect to the image data-based data read out from the imaging unit, and wherein, when the face authentication by the processing unit fails, the function execution unit outputs one frame's worth of image data containing the image data, and a capture time of the image data.

(16)

The electronic device according to any one of (1) to (15), further comprising:
a control mechanism that changes the angle of view of the imaging unit,
wherein the processing unit performs pet detection using the neural network calculation model with respect to the image data-based data read out from the imaging unit, and
wherein the function execution unit controls the control mechanism on the basis of the results of the pet detection by the processing unit.

(17)

The electronic device according to any one of (1) to (16),
wherein the processing unit performs state detection using the neural network calculation model with respect to the image data-based data read out from the imaging unit, and
wherein, when an abnormal state of a person of interest is detected through the state detection by the processing unit, the function execution unit notifies a pre-registered contact of the abnormal state.

(18)

The electronic device according to any one of (1) to (17),
wherein the processing unit performs first avoidance-target recognition using the neural network calculation model with respect to the image data-based data read out from the imaging unit,
wherein, when an avoidance target that is present ahead in the direction of advancement is recognized through the first avoidance-target recognition by the processing unit, the function execution unit performs second avoidance-target recognition with respect to the image data-based data read out from the imaging unit, and when the avoidance target that is present ahead in the direction of advancement is recognized once again through the second avoidance-target recognition, the function execution unit issues an instruction externally to perform an operation to avoid the avoidance target.

(19)

A solid-state imaging device, comprising:
an imaging unit that generates image data;
a processing unit that executes processing using a neural network calculation model with respect to the image data-based data read out from the imaging unit; and
an output unit that outputs the results of the processing.

REFERENCE SIGNS LIST 1, 3, 4, 5, 6 ELECTRONIC DEVICE
10 IMAGE SENSOR
11 IMAGING UNIT
101 PIXEL ARRAY UNIT
104 OPTICAL SYSTEM
12 CONTROLLER
13 SIGNAL PROCESSING UNIT
14 DSP
15 MEMORY
16 SELECTOR
17 DISPLAY
20 APPLICATION PROCESSOR
21 CONTROL MECHANISM
30 CLOUD SERVER

31 CPU
32 IMU
40 NETWORK
43 NONVOLATILE MEMORY

The invention claimed is:

1. An electronic device, comprising:
an image sensor that generates image data;
a processor configured to
execute neural network calculation model-based processing with respect to image data-based data that is read out from the image sensor;
execute processing utilizing a convolution neural network (CNN) with respect to data of an initially input region of the image data-based data of an identical frame; and
when the processing utilizing the CNN with respect to the data of the initially input region fails, processor is configured to execute processing utilizing a recurrent neural network (RNN) with respect to data of a unit region which is input next of the image data-based data of the identical frame;
a function execution circuit configured to perform a predetermined function to improve the image data on the basis of the results of the processing; and
a detection circuit configured to detect displacement of the electronic device, wherein the processor is configured to execute processing when the detection circuit detects any displacement.

2. An electronic device, comprising:
an image sensor that generates image data;
a processor configured to execute neural network calculation model-based processing with respect to image data-based data that is read out from the image sensor;
a function execution circuit configured to perform a predetermined function to improve the image data on the basis of the results of the processing; and
a detection circuit configured to detect displacement of the electronic device,
wherein the processor is configured to execute processing when the detection circuit detects any displacement,
wherein, during reproduction of the content by the application software, the processor is configured to recognize a facial expression using the neural network calculation model with respect to the image data-based data read out from the image sensor, and
wherein the function execution circuit is configured to use the social button to input a rating for the content according to the facial expression recognized by the processor.

3. An electronic device, comprising:
an image sensor that generates image data;
a processor configured to execute neural network calculation model-based processing with respect to image data-based data that is read out from the image sensor;
a function execution circuit configured to perform a predetermined function to improve the image data on the basis of the results of the processing; and
a detection circuit configured to detect displacement of the electronic device,
wherein the processor is configured to execute processing when the detection circuit detects any displacement,
wherein the processor is configured to perform first avoidance-target recognition using the neural network calculation model with respect to the image data-based data read out from the image sensor, and
wherein, when an avoidance target that is present ahead in the direction of advancement is recognized through the first avoidance-target recognition by the processor, the function execution circuit is configured to perform second avoidance-target recognition with respect to the image data-based data read out from the image sensor, and when the avoidance target that is present ahead in the direction of advancement is recognized once again through the second avoidance-target recognition, the function execution circuit is configured to issue an instruction externally to perform an operation to avoid the avoidance target.

4. An image processing device, comprising:
a processor configured to
execute processing using a neural network calculation model with respect to the image data-based data read out from an image sensor, wherein the processing includes
utilizing a convolution neural network (CNN) with respect to data of an initially input region of the image data-based data of an identical frame, and
on condition that processing utilizing the CNN with respect to the data of the initially input region fails, utilizing a recurrent neural network (RNN) with respect to data of a unit region which is input next of the image data-based data of the identical frame; and
output the results of the processing.

* * * * *